US012536563B2

(12) United States Patent
Nicholas et al.

(10) Patent No.: US 12,536,563 B2
(45) Date of Patent: Jan. 27, 2026

(54) METHOD AND SYSTEM FOR PRODUCT DELIVERY

(71) Applicant: Dizpersion Corporation, Evanston, IL (US)

(72) Inventors: Frank C. Nicholas, Glenview, IL (US); Ian B. Carswell, Chicago, IL (US)

(73) Assignee: DIE PERSION CORPORATION, Evanston, IL (US)

( * ) Notice: Subject to any disclaimer, the term of this patent is extended or adjusted under 35 U.S.C. 154(b) by 0 days.

(21) Appl. No.: 13/937,148

(22) Filed: Jul. 8, 2013

(65) Prior Publication Data

US 2014/0164126 A1 Jun. 12, 2014

Related U.S. Application Data

(63) Continuation of application No. 13/354,294, filed on Jan. 19, 2012, now Pat. No. 9,805,395, and a
(Continued)

(51) Int. Cl.
*G06Q 30/02* (2023.01)
*A63F 9/24* (2006.01)
(Continued)

(52) U.S. Cl.
CPC .......... *G06Q 30/0261* (2013.01); *A63F 9/24* (2013.01); *G06Q 30/08* (2013.01)

(58) Field of Classification Search
CPC .... G06Q 30/00; G06Q 30/02; G06Q 30/0207; G06Q 30/0212; G06Q 30/0217; G06Q 30/0222; G06Q 30/0224; G06Q 30/0226; G06Q 30/06; G06Q 30/3224; G06Q 30/0251; G06Q 30/0261; G06Q 30/08; A63F 9/24

See application file for complete search history.

(56) References Cited

U.S. PATENT DOCUMENTS 6,622,125 B1 * 9/2003 Cragun ................ G06Q 30/02
705/14.52
8,204,799 B1 * 6/2012 Murray ............. G06Q 10/0835
705/26.81
(Continued)

FOREIGN PATENT DOCUMENTS

WO 2001008071 A1 2/2001
WO 2001011523 A1 2/2001
WO 2013090694 A1 6/2013

*Primary Examiner* — Jeffrey K Wong
(74) *Attorney, Agent, or Firm* — Douglas B Teaney; CARDINAL LAW GROUP, LLP

(57) ABSTRACT

A networked system implements a method of delivering product to a user and including promotional products on a delivery entity for delivery to potential customers within a determined target area of the user delivery location. A server receives a purchase delivery request from a user at a user location. At least one promotional product is determined for inclusion on a delivery entity associated with the user delivery request. A target area is determined based on the user location. Notifications of the promotional product are sent to potential customers within the determined target area, allowing the potential customers to request the promotional product.

41 Claims, 19 Drawing Sheets

Related U.S. Application Data continuation of application No. 11/134,116, filed on May 20, 2005, now Pat. No. 12,299,693.

(60) Provisional application No. 61/673,091, filed on Jul. 18, 2012, provisional application No. 61/668,948, filed on Jul. 6, 2012.

(51) Int. Cl.
*G06Q 30/0251* (2023.01)
*G06Q 30/08* (2012.01)

(56) References Cited

U.S. PATENT DOCUMENTS

| | | | |
|---|---|---|---|
| 2003/0125963 A1* | 7/2003 | Haken | G06Q 10/08 705/26.1 |
| 2003/0198346 A1 | 10/2003 | Meifu | |
| 2004/0153357 A1* | 8/2004 | De Sylva | G06Q 10/06315 705/7.25 |
| 2008/0109246 A1 | 5/2008 | Russel | |
| 2008/0162305 A1* | 7/2008 | Rousso | G06Q 10/0631 705/26.5 |
| 2010/0198841 A1* | 8/2010 | Parker | G06F 17/30887 707/750 |
| 2012/0185363 A1* | 7/2012 | Gilbert | G06Q 30/0641 705/27.1 |
| 2012/0203619 A1 | 8/2012 | Lutnick | |
| 2012/0233085 A1* | 9/2012 | Zimberoff | G06Q 10/083 705/330 |
| 2013/0006739 A1* | 1/2013 | Horvitz | G06Q 30/06 705/14.23 |

\* cited by examiner

1600

1800

METHOD AND SYSTEM FOR PRODUCT DELIVERY

RELATED APPLICATIONS

This application claims the benefit of U.S. Provisional Application No. 61/668,948, filed Jul. 6, 2012, entitled Online Marketing System and Method, by Frank C. Nicholas, et al., 61/673,091, filed Jul. 18, 2012, entitled Online Marketing System and Method, by Frank C. Nicholas, et al., is a continuation in part of U.S. application Ser. No. 13/354,294, filed Jan. 19, 2012, entitled Online Marketing System and Method, by Frank C. Nicholas, et al., and is a continuation in part of U.S. application Ser. No. 11/134,116, filed May 20, 2005, entitled Method and System for Providing Network Based Target Advertising and Encapsulation, by Frank C. Nicholas, et al. The entirety of each application is hereby incorporated by reference.

FIELD OF THE INVENTION

The present invention generally relates to product and service delivery. More specifically, the present invention relates to coordination, management and notifications related to delivery opportunities.

BACKGROUND OF THE INVENTION

There are a variety of services that allow consumers to order products for delivery. UPS and FedEx are examples of delivery services. Specialized services exist for certain delivery types. For example food delivery is provided by GrubHub, Delivery.com, Savored, and others.

As the population continues to age, the need for efficient delivery methods should increase. Discounts may be provided in coordination with deliveries to maximize customer purchasing and provide the most efficient delivery process. Coordination may include logistics between multiple suppliers, various customers, various drivers, pushing recommendations for complimentary products, and others.

SUMMARY OF THE INVENTION

One aspect of the invention includes a method of delivering a product to a user. The method includes: receiving a purchase delivery request at a server from at least one user at a user location, determining at least one promotional product for inclusion on a delivery entity associated with the user delivery request, determining at a server a target area based on the user location, sending proximate delivery notifications of the promotional product to potential customers within the determined target area, and receiving at least one request for the promotional product at a server from at least one customer within the determined target area. The method may further include adjusting a delivery schedule based on the received promotional product requests, adjusting a delivery route based on the received promotional product requests, determining an adjusted target area based on the adjusted delivery route and sending notifications of the promotional product to potential customers within the determined adjusted target area, sending notifications to the potential customers in the target area during a delivery to the user location, determining product based on at least one product profile associated with the target area, and providing the user a drop off time.

Another aspect of the invention provides a system for delivering product to a user. The system includes at least one server having a processor, a computer readable storage medium, and instructions tangibly embodied in the computer readable storage medium for executing a method that includes: receiving a purchase delivery request from at least one user at a user location, determining at least one promotional product for inclusion on a delivery entity associated with the user delivery request, determining a target area based on the user location, sending proximate delivery notifications of the promotional product to potential customers within the determined target area, and receiving at least one request for the promotional product from at least one customer within the determined target area. The system may include instructions tangibly embodied in the computer readable storage medium for executing a method that further includes adjusting a delivery route based on the received promotional product requests, and determining an adjusted target area based on the adjusted delivery route and sending notifications of the promotional product to potential customers within the determined adjusted target area.

Another aspect of the invention provides a computer readable storage medium for delivering product to a user. The computer readable storage medium comprising instructions that when executed perform a method that includes: receiving a purchase delivery request from at least one user at a user location, determining at least one promotional product for inclusion on a delivery entity associated with the user delivery request, determining a target area based on the user location, sending proximate delivery notifications of the promotional product to potential customers within the determined target area, and receiving at least one request for the promotional product from at least one customer within the determined target area. The computer readable storage medium may include instructions that when executed perform a method that further includes adjusting a delivery route based on the received promotional product requests, and determining an adjusted target area based on the adjusted delivery route and sending notifications of the promotional product to potential customers within the determined adjusted target area.

creation procedure for agent-based offer acquisition using an external email service provider.

Figure 10A:
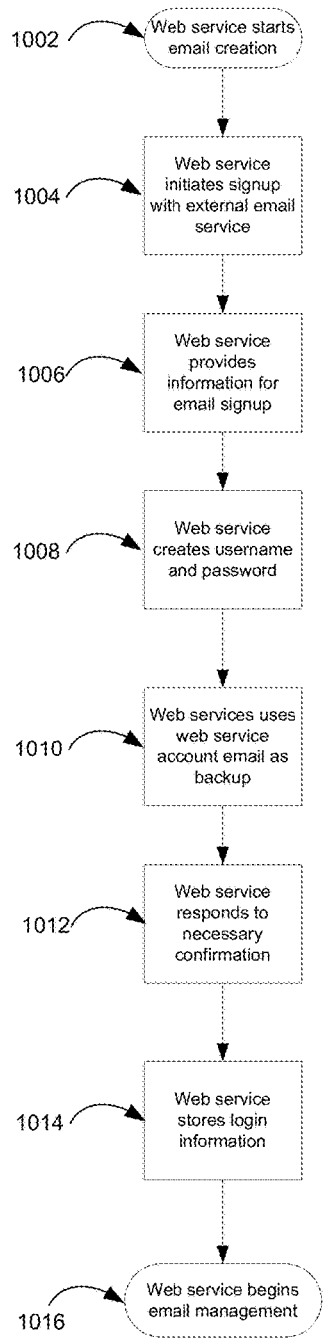
Figure 10B:
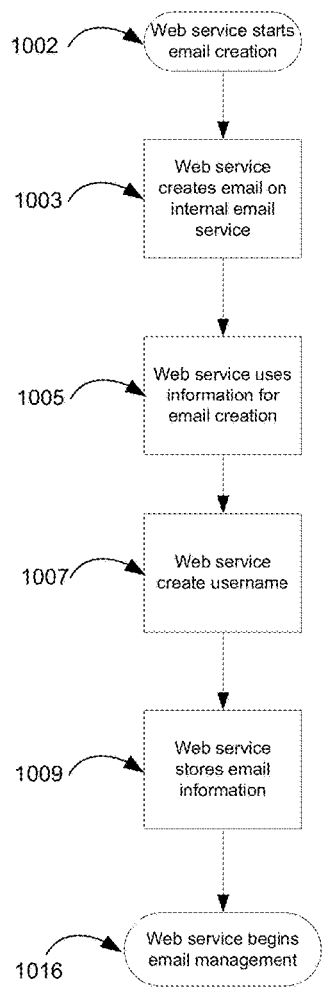

FIG. 10B illustrates one embodiment of a flowchart of an email account creation procedure for agent-based offer acquisition using an internal email service provider.

Figure 10C:
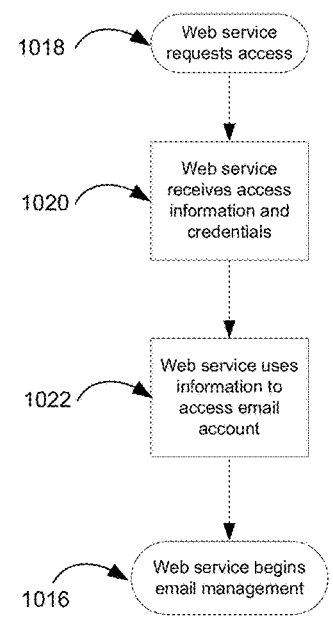

FIG. 10C illustrates one embodiment of a flowchart of an email account access procedure for agent-based offer acquisition using an existing email account.

Figure 11A:
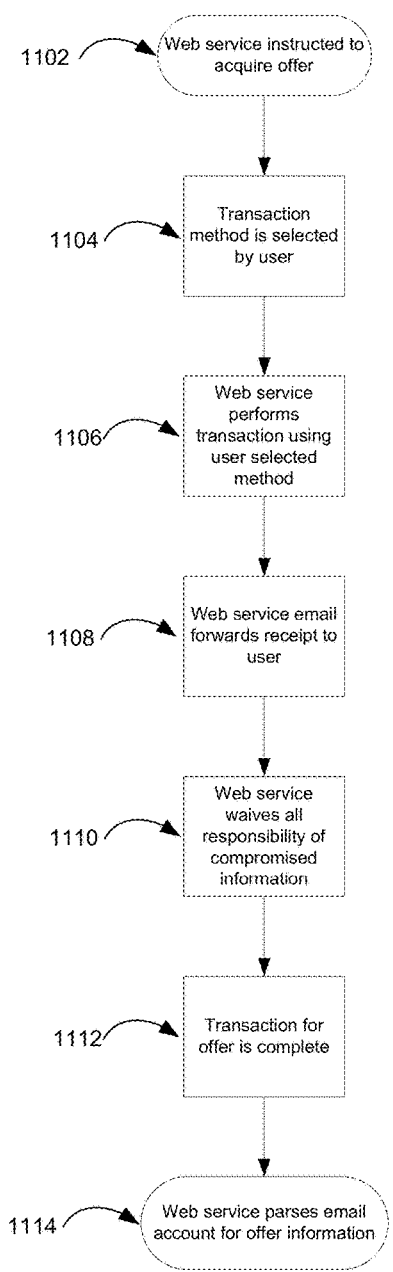

FIG. 11A illustrates one embodiment of a flowchart of a direct transaction method for agent-based offer acquisition.

Figure 11B:
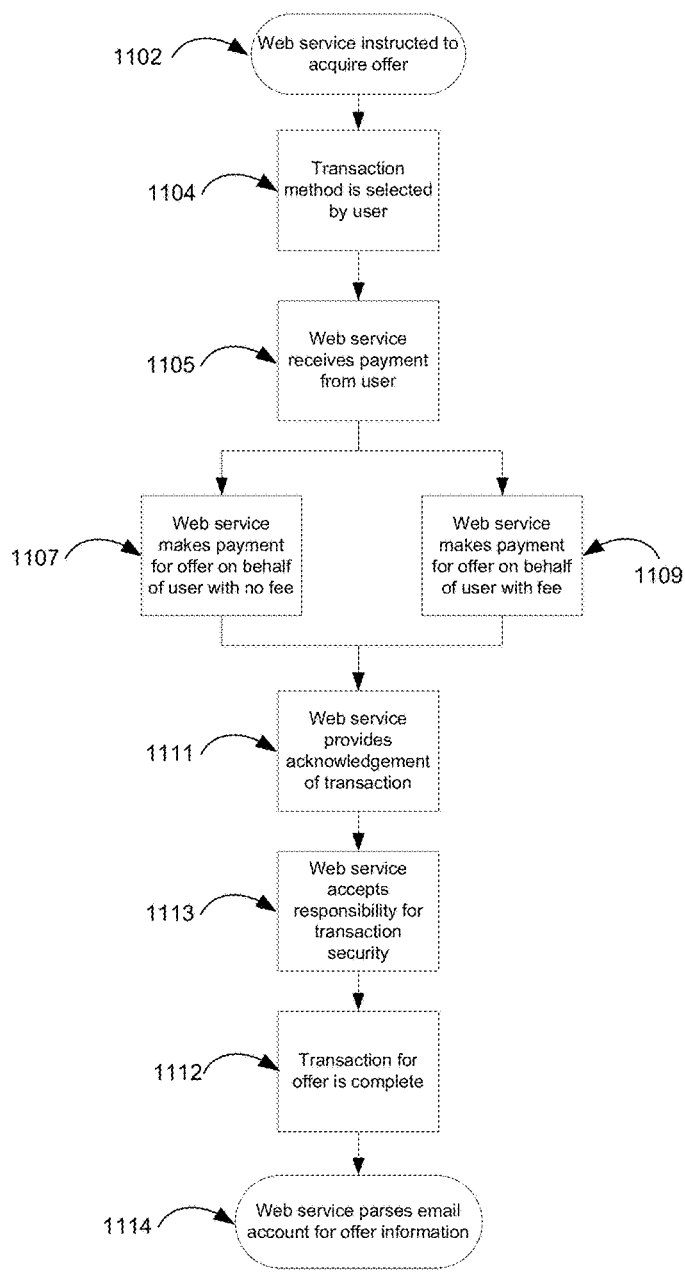

FIG. 11B illustrates one embodiment of a flowchart of a secure transaction method for agent-based offer acquisition.

Figure 12:
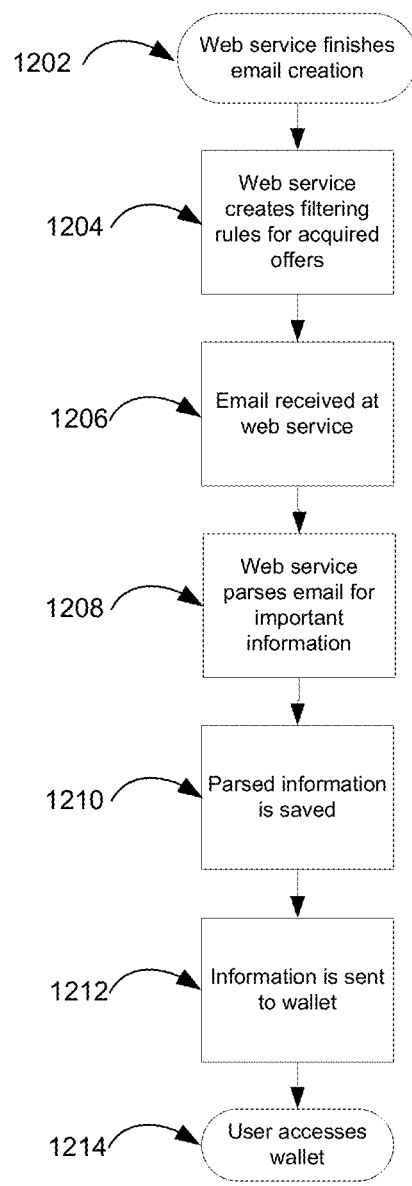

FIG. 12 illustrates one embodiment of a flowchart of an email filtering and parsing procedure controlled by an agent-based offer acquisition web service.

Figure 13:
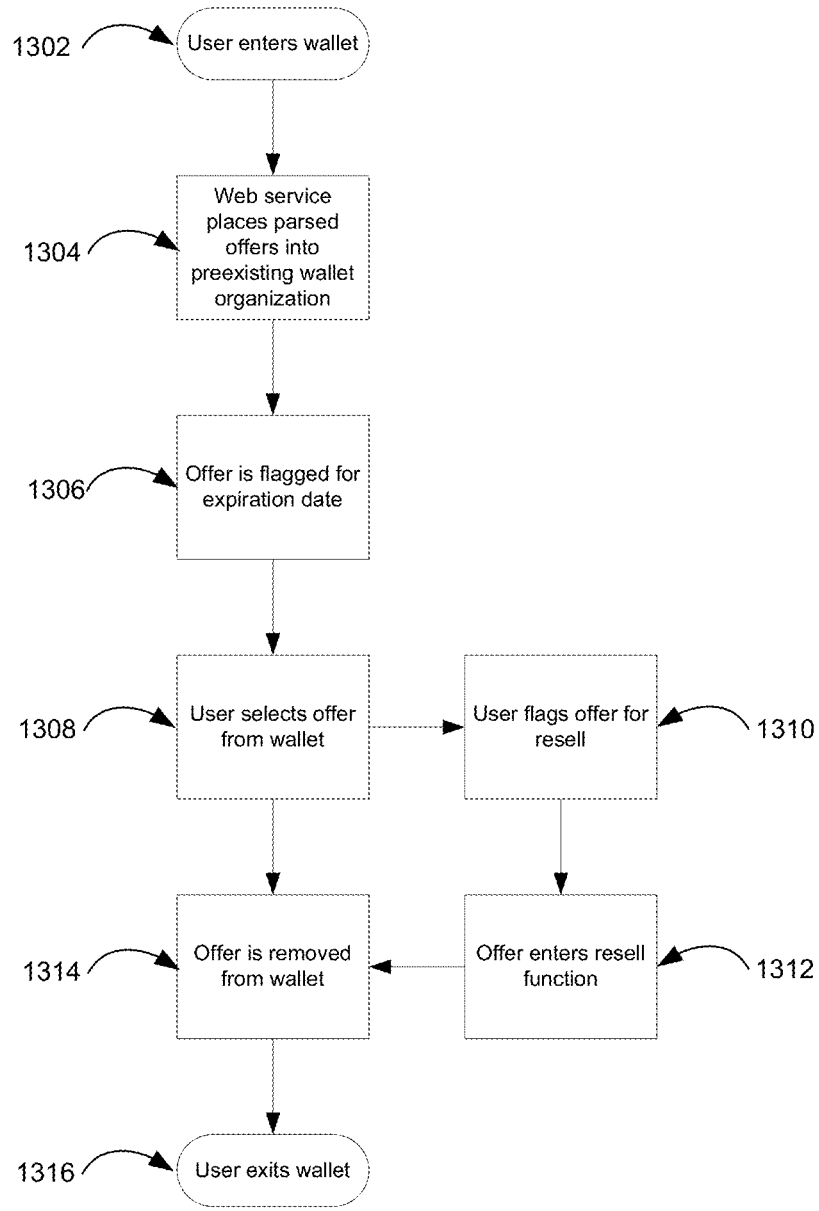

FIG. 13 illustrates one embodiment of a flowchart of offer organization within an offer wallet.

Figure 14:
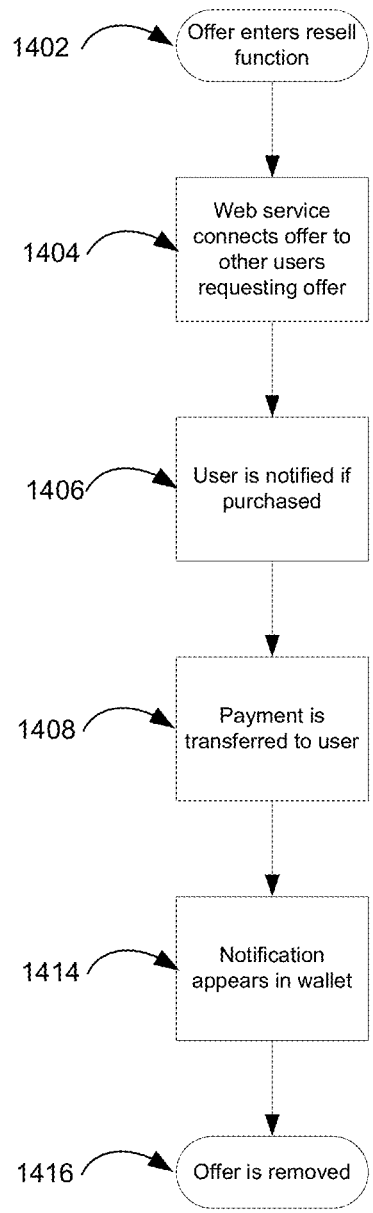

FIG. 14 illustrates one embodiment of a flowchart of a resell function associated with an offer wallet.

Figure 15:
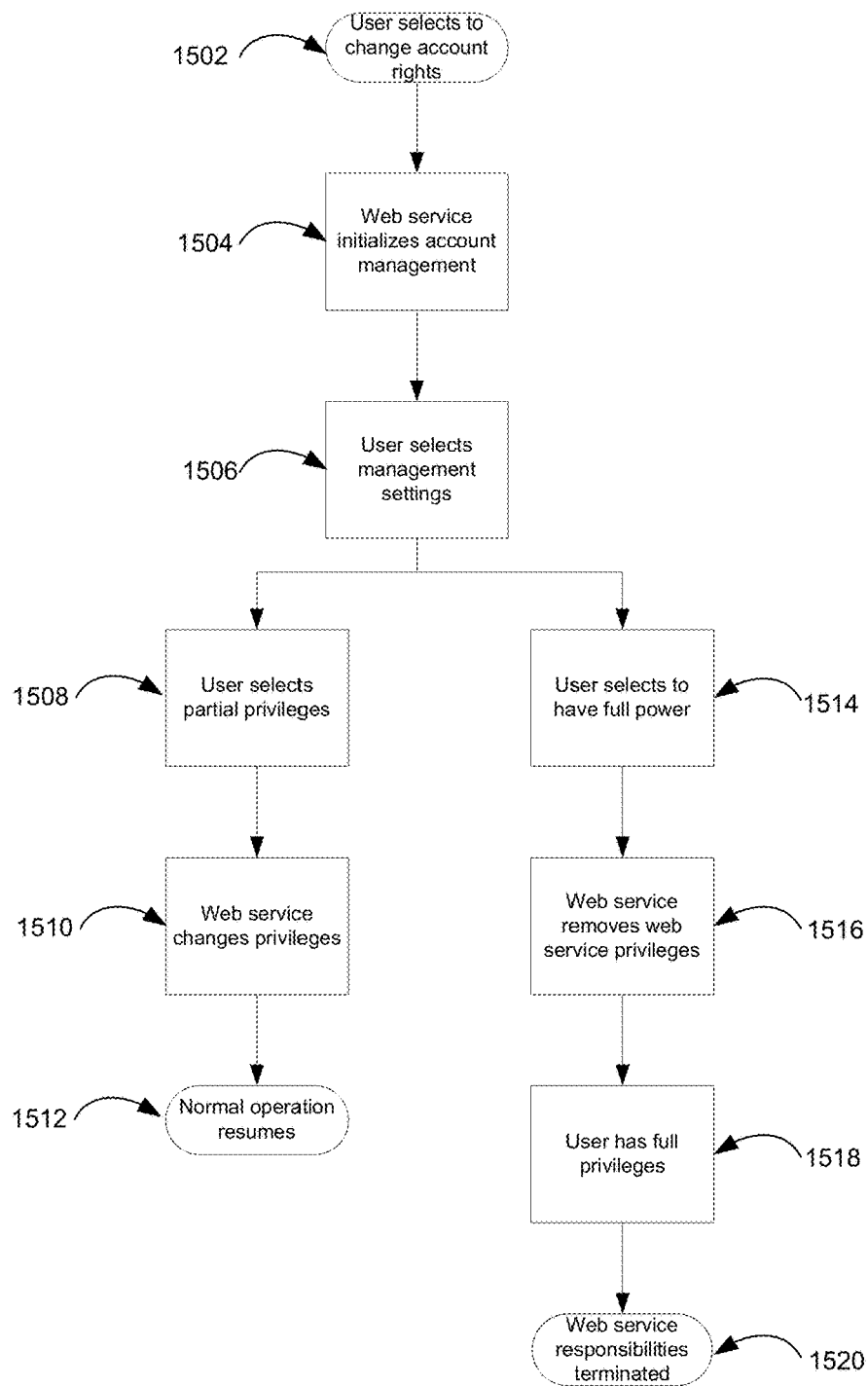

FIG. 15 illustrates one embodiment of a flowchart of responsibility transfer of agent-managed offer site accounts.

Figure 16:
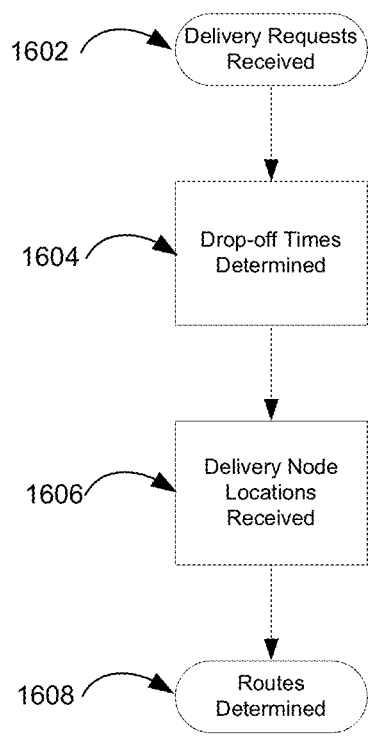

FIG. 16 illustrates one embodiment of a flowchart for managing deliveries.

Figure 17:
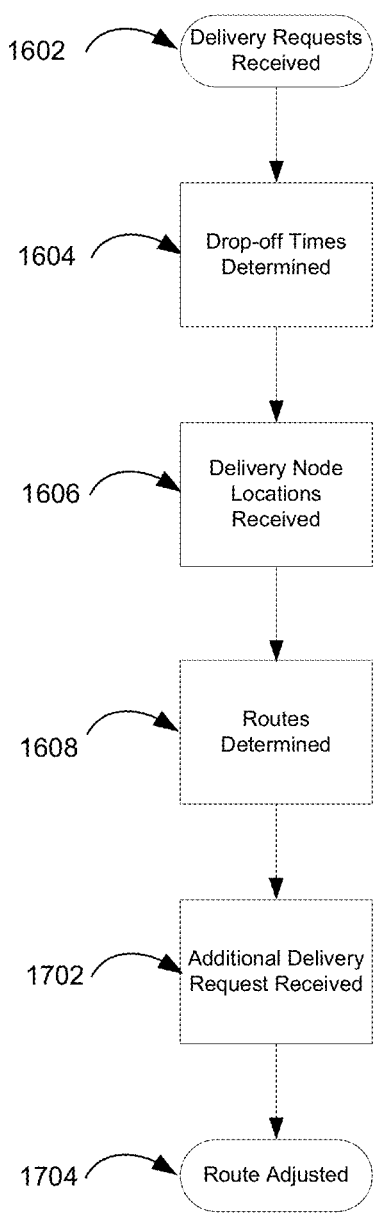

FIG. 17 illustrates one embodiment of a flowchart for managing deliveries including route adjustment based on additional delivery requests.

Figure 18:
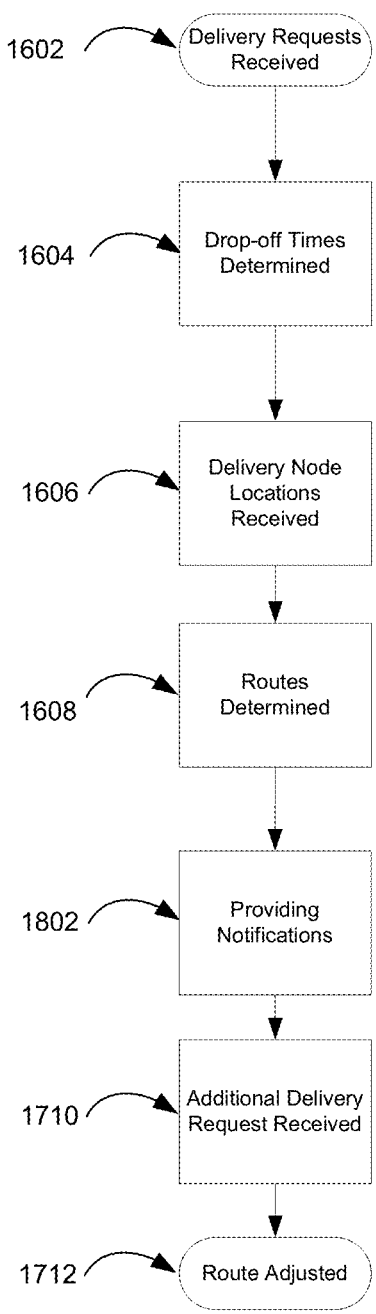

FIG. 18 illustrates one embodiment of a flowchart for managing deliveries including providing notifications to consumers.

Figure 19:
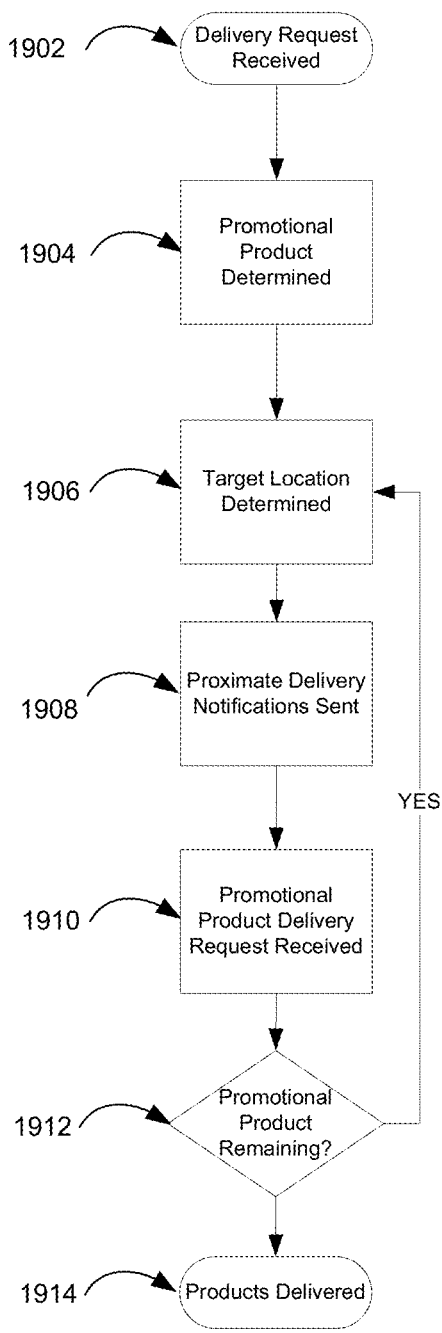

FIG. 19 illustrates one embodiment of a flowchart for managing deliveries including providing notifications to consumers.

DETAILED DESCRIPTION OF A PRESENTLY PREFERRED EMBODIMENT

Figure 1:
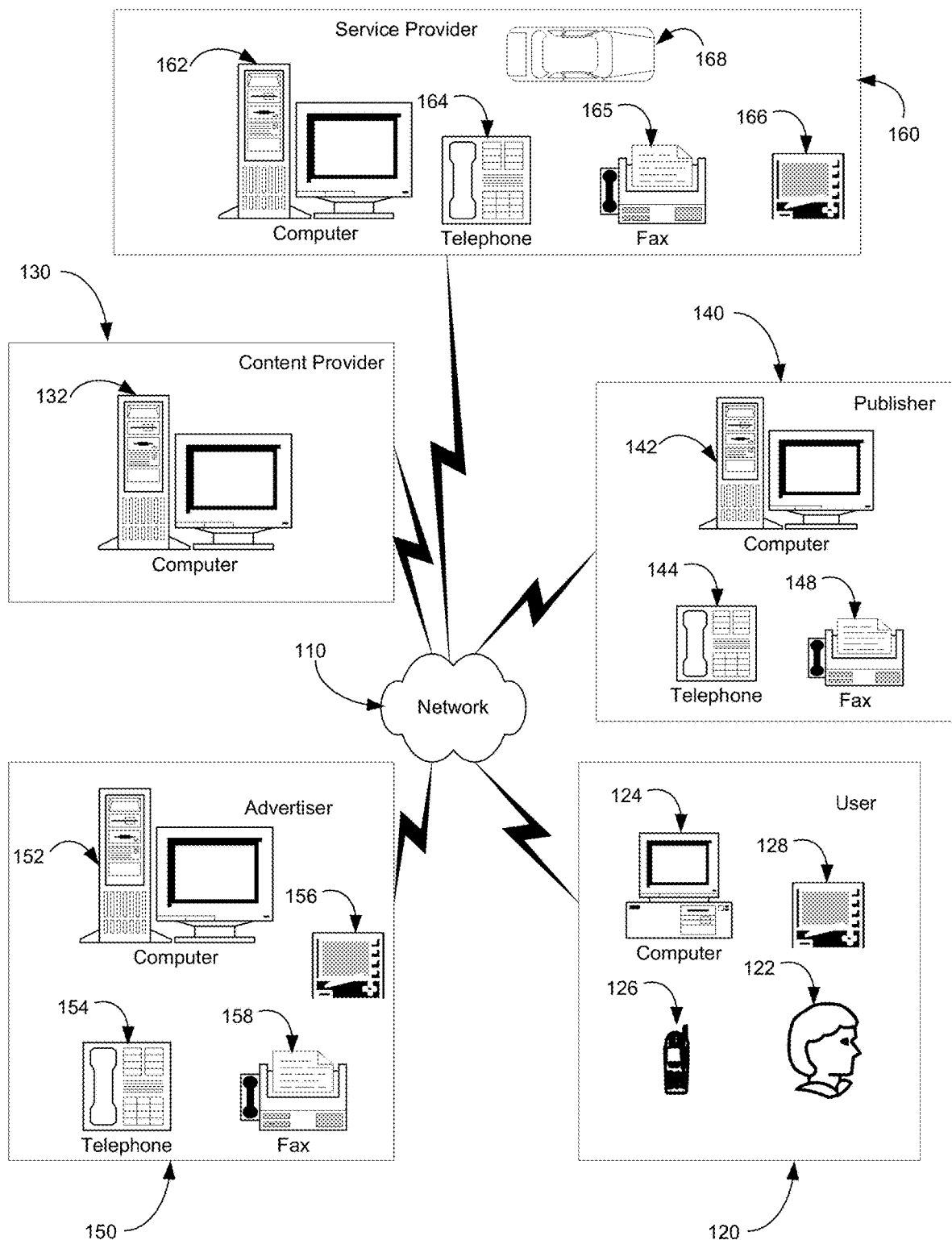
FIG. 1 illustrates an exemplary environment for practicing the present invention.

Referring to FIG. 1, a telecommunication system 100 of the present invention is shown. Telecommunication system 100 comprises a network 110 which provides the communications links between the various nodes of telecommunication system 100. Links through network 110 may include permanent connections (e.g., wire or fiber optic cables), temporary connections made through telephone, wireless or satellite communications, or various nodes of telecommunication system 100 may actually be hosted on the same physical hardware platform removing the necessity of a network link altogether. Network 110 may be in the form of public or private connections available over the Internet, an extranet, an intranet, a hard-wired local area network (LAN), a hard-wired wide area network (WAN), a wireless LAN, a wireless WAN, cellular network, satellite network, and/or other forms as would occur to those having ordinary skill in the art.

A user node 120 of telecommunication system 100 operates to facilitate communications information between a user 122 of user node 120 and one of the other nodes of telecommunication system 100, for example in audio form and/or visual form. The information may be requested by user node 120 or may be pushed to user node 120 by another node. Devices, apparatuses and systems, such as for example, a landline or mobile phone 126, a personal digital assistant or tablet computer such as an iPad 128, and a personal computer 124 as illustrated, or any other user communication devices may be utilized within user node 120 to establish such communications. Devices, apparatuses and systems around the user may also be considered portions of user node 120, for example a digital signpost or digital billboard 129. Other suitable devices, apparatuses and systems not illustrated include networked household appliances (e.g., televisions, refrigerators, etc.), digital or satellite radio systems, and others as would occur to those having ordinary skill in the art.

A content provider node 130 includes one or more servers 132 for communicating with the other nodes of telecommunication system 100. The requested information, pushed information, and generally provided content can be in a variety of forms, such as, for example, a static or dynamic web page (HTML or XML), a radio or video broadcast or narrowcast, wireless application protocol (WAP) content, a short messaging service (SMS) message, or other forms of network information as known in the art. All content may be provided as the entirety of requested or provided content, or as a portion. For example, content provider node 130 may provide an entire web or WAP page or only a segment of a page. Accordingly, content server 132 can include suitable hardware platforms and software modules to operate as a web site server, a radio broadcast server, etc.

Referring again to FIG. 1, publishing node 140 includes one or more servers 142 for communicating with the other nodes of telecommunication system 100. Publishing node 140 may include apparatus and communications devices such as telephone 144, or fax machine 146. In one embodiment, publishing node 140 provides some portion or all of the content for content provider 130. Publishing node 140 may also publish content or advertisements for advertiser node 150. Publishing node 140 may include interfaces for uploading or inputting by some means content that is to be published via network 110.

Advertiser node 150 represents advertisers that may be any of an end advertiser of a product or service, a marketer, a publicist, a politician, any other similar party, or any party acting as an agent of the advertiser such as a media company, public relations company, advertising agency, or traditional publication. Advertiser node 150 may include apparatus and communications devices such as computer 152, telephone 154, a personal digital assistant or tablet computer such as an iPad 156, or fax machine 158. In one embodiment, advertiser node 150 may represent a restaurant or some other retail location. The apparatus at advertiser node 150 may run a local point of sale system, inventory system, or the like, and alternatively on or more of the apparatuses may access such systems via a cloud-based service at service provider node 160.

Service provider node 160 includes one or more servers 162 for communicating with the other nodes of telecommunication system 100. While displayed as a single node, service provider node 160 represents any number of separate companies, services, nodes and servers. For example, Mapquest or Google Maps may provide mapping functionality and services via mapping service server 162. Email service may be provided by Hotmail, Gmail, or Yahoo Mail via mail service server 162. Evite may provide event invitation and response management services via invitation service server 162. OpenTable may provide reservation services via reservation service server 162. Quova may provide IP-to-geography translation services via IP-to-geography translation server 162. Gracenote or Shazam may supply music identification services through its CDDB product and services via music identification server 162. Facebook, MySpace, or the like may provide social network services via social network server 162. Facebook or Google may provide authentication services via authentication server 162. Paypal or Verisign may provide payment services via payment server 162. Groupon, Living Social, Restaurant- .com, or the like may provide deal certificate services via deal certificate server 162. Zynga or Rovio Mobile may provide gaming services via gaming server 162. Google may provide a calendar service via calendar server 162. Further services and servers may include transportation dispatching server 162, language translation server 162, data storage server 162, concierge offer server 162, purchase agent server 162, point of sale server 162, inventory management server 162, delivery coordination service provider server 162, and others. Service provider node 160 may also include one or more computers 162, telephones 164, either landline or mobile, fax machines or servers 165, personal digital assistants or tablet computers such as an iPads 166. Service provider node 160 may also include one or more vehicles 168 such as cars, trucks, motorcycles, bicycles or the like. Each vehicle 168 may be referred to individually as a delivery node. In one embodiment, a delivery coordination service provider 160 may be comprised of or deliver instructions to one or more vehicles 168, or individual delivery nodes, also referred to as delivery service nodes or delivery entities, may be only a service provider representative without a vehicle but operating on foot or by bicycle. A product for delivery may be said to be on a delivery entity, which may mean in the trunk of a car, in the backpack of a bicyclist, in a cargo hold or attached to an unmanned drone aircraft, or the like. In one embodiment, vehicle 168 may be an unmanned vehicle, such as Google's self-driving car, or a robot. These service providers are only exemplary, and within each service category other service providers may be available, or another node of the system may provide like service. Service providers may also perform advertising or publishing functions. Service providers may operate as independent nodes of telecommunications system 100, or may provide copies of their code, databases, systems and the like for local installation on another node of telecommunications system 100. Service may be provided in the form of data feeds, application program interface (API), web services, or any other form of communication available in telecommunications system 100 as would occur to one skilled in the art.

While the nodes of FIG. 1 are illustrated and described as solely communicating using network 110, this is only to be considered a best mode, and not limiting. Various nodes, where possible, may communicate using other forms of communication including phone, fax, in-person meetings, mail, and other forms known in the art. In addition, each node may consist of more or fewer communications devices, personnel, and apparatuses than are illustrated. Further, while the nodes, and further their component make-up (e.g. servers, databases), are described as operating independently and on separate platforms, it should be well understood by one skilled in the art that various functions of the node or functions of the multiple nodes may be performed on the same physical hardware, or spread in different configurations, arrangements and architectures among the various nodes. For example, a single restaurant may be considered both an advertiser node 150, because it may advertise its services, and also a service provider node 160, because its services may be integrated in with User node 120, content provider node 130, publishing node 140, advertising node 150, and service provider node 160 may each provide or receive feed formatted content. Examples herein will typically focus on XML, but it should be understood that other feed formatted content may employ like solutions. The term marker shall typically refer to an element, attribute, or group of elements and attributes within feed formatted content, and the terms marker, element, and attribute shall generally be understood to mean formatted information within feed formatted content.

For the purposes of this application, a competition may be referring to a game of skill or a game of chance. Competitions may be provided by a gaming service provider node 160. The competition may be single participant, multi-participant with each participant competing on their own behalf, or team-based multi-participant with each participant competing on behalf of a team. A "competition result" is defined as any intermediate or final score, intermediate or final victory or loss, or other intermediate or final action or activity that may be recorded during a competition. For example, a competition result may be a knock-down in a fighting game, or the first knock-down in the game. By way of another example, a competition result could be the highest score for a particular week in a fantasy league. For the purposes of this application, a "competition rank" is defined as an individual or team's rank based on one or more competition results. For example, participants may receive a competition rank based on the final scores they receive at the end of a game. By way of another example, competition rank may be based on the highest number of knock-downs in a fighting game. For the purposes of this application, the term "deal competition" is defined as a game or competition for which there is a set of deals or discounts awarded based on at least one competition result of the game or competition. The phrase "deal payment terms" is defined as the amount an individual must pay in order to receive an amount of product or service, as well as any other specific terms of the purchase such as valid purchase times or dates. For example, deal payment terms may prescribe that an individual pay $10 for $20 of food and drink at Joe's Bar.

Deals may be redeemed in a variety of ways. For example, an individual may need to print out a certificate and present it at the time of purchase. Alternatively, the individual may be provided with a code that provides a discount for online purchase. By way of another example, the individual may present a certificate, number, bar code, or some combination thereof, displayed on their mobile device, either via a mobile web browser or mobile app. In one embodiment, the individual may register an existing credit or debit card or receive a credit, debit, or other type of card that is associated with the deals they own. Such a credit or debit card may automatically reimburse the individual based on deal terms either at the time of purchase or by a second repayment transaction. Alternatively, an electronic wallet, or e-wallet may be associated with owned deals. Similarly, a payment services provider such as PayPal may allow a user's account to be associated with owned deals. In all cases, a deal may be purchased in advance using one of these payment methods, processed at the time of payment, provided as a reimbursement back into the account, or the like.

Deals may be brokered in a variety of ways. For example, contract terms between a deals certificate service provider 160 and a vendor may specify that the deal will only be made available for a limited period of time. When that time expires, the online provider of deals will pay the vendor an amount based on the number of deals sold. Alternatively, the contract may specify that the deals certificate service provider has the rights to pre-purchase up to a certain volume of deals. For example, the online provider of deals may purchase 100 certificates valued at $10 from a vendor for a price of $4 each. Or, the online provider of deals may contractually have the option to purchase up to 100 certificates each month at terms such as those noted. By way of another example, the contract could specify prepayment on a total value of deals, with only a certain amount of the total value available for resale each month. In another embodiment, the online provider of deals may pay the vendor only after the purchaser of the deal redeems that deal.

In one embodiment of the present invention, at least one deal competition is provided via a user interface to users. The user interface may be a web page, a computer program, a mobile phone application, or any other user interface as known in the art. The deal competition on the user interface may state, for example: "Compete to win the best price on this deal for $10 worth of purchasing power at Mickey's—it takes at least three to compete in the javelin throw completion—first place gets the $10 for 4 dollars, last place pays full $10, players in between will be spaced proportionately between the first and last place participants payment requirements. Max number of participants for this competition is 10 and competition will start when we have at least 3 participants—The scores will be posted as they occur. Required payments will be displayed upon completion of the competition, which is at 10:00 PM or at the completion of 10 users, whichever comes first."

In one embodiment, a private group can select a closed or private competition with a given number of users. Alternatively, competitions may be open to the public. Requirements for the number of users can be posted on the interface or accepted when a threshold is reached. A minimum or maximum number of participants necessary to start or finish a deal competition may be referred to as a competition participant threshold. A private game may be managed by a first user such that they distribute a link or code to access the private game. In one embodiment, a password may be provided to access the private game. A game may also be provided in conjunction with a social network, such as Facebook, and the privacy of the game may be based on relationships within the social network. The competition may make use of Facebook Connect, or some other social network services API, to provide privacy based on social network relationships. Alternatively, the competition could take place within the social network. For example, players of the popular game Farmville could opt to offer private competitions versus their friends. When a friend of that individual logs in to play Farmville, they could see the invitation to the private deal competition. After joining the deal competition, the players could receive one or more deals based on one or more competition results. Alternatively, all players with access to Farmville could elect to play in a deal competition mode. The deal competition mode could last for a certain period of time after which they receive a deal based on one or more competition results, or the user could buy in to deal competition mode with a certain amount of money and play until it's been spent on one or more deals awarded during competition.

In one embodiment, the game of skill may be a simulated fight, or battle competition, with or without weapons, where each player has an amount of health points and as the player gets, for example, shot, stabbed or punched, they would lose health points until they are depleted. The first player out would get the last place deal and as other players are eliminated they are ranked and get a better deal until the last player standing gets the best deal. Alternatively, for example, all losers could get one deal and the winner gets a better deal. Or again alternatively, a certain number of top place finishers would get a better deal.

In one embodiment, an invitation to compete can be posted by a user on a social network; the invitation would be coded and associated with a competition. In one embodiment the user would select a minimum number of players and a maximum number of players. Deals for each place in the competition would be computed for each number of users. For example, a user viewing the invitation to compete may see a deal set for three users: first place would be pay $6 for $10 at Mickey's Bar, second place would pay $8 for $10 dollars at Mickey's Bar, and third place would pay $10 for $10 at Mickey's Bar. The user viewing the invitation to compete could also see the deal set for when there are 4 players: first place would pay $5 for $20, second place would pay $7 for $10, third place would pay $8 for $10 and fourth place would pay $10 for $10. Alternatively, all players may be required to pay in a fixed amount prior to the beginning of the competition, but the certificate amount they receive as an award deal would be based on the place they finished. For example, all players could pay $10, and first place would receive $20, second place would receive $15, and third place would receive $10.

In one embodiment, the user setting up the challenge could select a winner take all competition, where for example all the losers would pay $10 for $20 and the winner would pay nothing for $10.

In one embodiment, the participants in a single competition may select among a variety of products or service providers from whom they will receive their award deal. For example in a three player competition, player one would be playing for a deal at Joe's bar and get $20 for $5 for first place, $20 for $8 for second place and $20 for $10 for third place, and player two would be playing for a deal at Lin's Salon and get $30 for $10 for first place, $30 for $12 for second place, and $30 for $15 for third place, and player three would play for a deal at Bob's Rib House and get $12 for $1 for first place, $12 for $4 for second place, and $12 for $6 for third place.

In one embodiment, the user setting up the competition could select an extended deal rule set. For example, a commissioner of a 10 player fantasy football league could set up deals for the weekly head-to-head competitions, along with a deal for the highest point scoring team for the week. In the two-player head-to-head weekly competitions, the winning player could get a more favorable deal than the loser. In the 10-player weekly high point competition, all losers could have to pay more for the deal than the winner. The 10 players could be ranked and payment for their deal would be based on their rank. At the end of the season deal competitions could also be set up for the playoffs and championship.

In one embodiment, vendors who are involved with deals can allow other vendors to subsidize their deal. The vendor involved with the deal may, for example, select only non-competing entities. These non-competing entities can then provide an add-on deal by providing their own deal. In one embodiment the competition provider would get a fee for the ability to place the add-on deal that can be used in part or in full to make the deal more attractive to the consumer or provide direct payment in whole or in part to the vendor associated with the competition. In one embodiment, a second vendor may subsidize a first vendor's deal by placing a coupon on a page that must be printed out for redemption of the first vendor's deal. For example, the top half of a page could be a certificate for $12 at Bob's Rib House, where the bottom half of the page has a coupon for a discount on a case of Budweiser™. In one embodiment, the deal competition for $12 to Bob's Rib House may generally require a $2 payment from the first place finisher in the competition, but because the Budweiser coupon will be placed on the certificate the participant may only be required to pay $1. A deal or coupon accompanying a deal awarded based on a deal competition may be referred to as an add-on deal.

In one embodiment of the present invention, a vendor may provide additional services to the participants in a game or competition. For example, in conjunction with a fantasy sports provider such as Yahoo!™, Buffalo Wild Wings™ may provide a paid package for leagues including one or more deal competitions. A ten player league may pay $200 to have a Buffalo Wild Wings fantasy league package. The package may include a draft party with reserved table at Buffalo Wild Wings and one hundred wings. The package may further include deal competitions as described above for head-to-head play, playoffs and weekly point winners.

In one embodiment, deal competition participants may be granted certain preferred participant status in association with one or more vendors. For example, a participant who has selected to play specifically for deals at Joe's Bar more times than any other participant in the system may be granted preferred participant status with respect to Joe's Bar. In one embodiment, the success or failure within the competitions may influence the preferred participant status. For example, a participant who has won the most deals, or the best deals in aggregate, from Joe's Bar may be granted preferred participant status. In one embodiment, preferred participant status may be granted to more than one participant. Unrelated participants may be granted preferred participant status at the same location. Alternatively, a participant who has been granted preferred participant status may extend further preferred participant grants to friends or associates. Preferred participant status may grant the participant discounts off of or additions to the standard deal payment terms. Preferred participant status may grant entirely separate standing deals to the holder of that status such as a reserved table at a restaurant, set menu item discounts, or the like. Further, different levels of preferred participant status may be granted. For example, a participant with the top preferred participant status for a venue may be given set menu item discounts during popular hours such as 6-8 pm on weeknights. Whereas a participant with the second level down preferred participant status for the same venue may be given the same set menu item discount during less popular hours such as 4-6 pm on weeknights.

In one embodiment, preferred participant status may be tracked and granted based on a loyalty point program, or loyalty participation. Loyalty points, or loyalty participation, may be provided based on deal competition participation, based on success or failure within deal competitions, based on redemption of deals, based on patronage, or any combination of these or the like.

Referring again to the example of the simulated fight game of skill, loyalty points or preferred participant status may impact the health points of an individual or a team. For example, an individual with preferred participant status may receive bonus health points when entering a deal competition. Alternatively, patronage at a venue may impact the health points within the competition in real time. For example, if the individual is participating in the competition at the venue and their health points are getting low, the individual may, for example, order an entrée and receive an immediate boost in health points.

By way of another example, a video game networked through various venues, such as Golden Tee™, could be played in a deal competition mode. In such an instance, the cost to play the game may be significantly higher—for example $20 for a single round—but at the completion of the round participants at various different venues would receive certificates for redemption at the venue in which they are playing based on the results of the round. Again, preferred participant status may be granted or impacted based on participation in such a networked game.

In one embodiment, the location of a user may be identified. Location may be established based up on a known location of an installed gaming console, for example a certain Golden Tee™ game may be known to be installed at a certain location. Alternatively the gaming service provider may utilize an IP-to-geography translation server to identify the geo-location of the user. By way of another example, the user may check in to a location, for example using a social network service. Other users can see them via the interface and challenge them to a deal competition. An instant message could be sent or accepted based on the user preferences. The interface may also show the user's team association and a team challenge could be initiated. In one embodiment the challenge can attach a video file, for example, the challenger taunting the user to compete. In one embodiment there can be a live video chat between the challenger and other potential participants.

In one embodiment, payment may be made only by the losers of a competition. This could be done by allowing the deal to be purchased using the losers account.

In one embodiment, a vendor could access a vendor interface which would provide the vendor a means to sign up to specify a number of deals to be prepaid by a marketing company. For example, Joe's bar would enter the vendor interface and enter into a contract to allow Marketing Co. to purchase up to 30 $20 certificates per month. The upfront payment of these 30 certificates for the first month is $6 dollars per certificate, or $180 in total. The certificates now can be provided to consumers via marketing events on various types of websites, including, for example, sites offering group purchasing deals (like Groupon, or Living Social), those offering straight pay deals (like Restaurant.com), Dutch auction sites (where, for example the $20 certificate is initially offered at $10 and is reduced incrementally over time until a set number are sold), or competition sites as discussed herein.

For a marketing company to automate the prepaid system, the cash flow from operations can be controlled to maintain a predetermined profit margin. In the example above, if the predetermined margin is set at an average selling price of $7 from Marketing Co. to the consumer, the profit margin would be $1 for $6 worth of deal inventory, which equates to a 16.7 percent profit margin. So, for example, if half or 15 are distributed to a Dutch auction site (in this example owned by the Marketing Co.), and the average sale price is $8, then the other 15 certificates, distributed to a deal competition site, again owned by Marketing Co., the average price of the prices paid for the deal by participants in the completion could be as low as $6 to achieve the predetermined margin which requires an average sale price of $7.

Upon completion, or during the marketing event, revenue results from the marketing event (e.g. the Dutch auction, or deal competition) are sent to the operations controller. A revenue requirement for the next event is set based on these received revenue results. Based on the timing of the revenue received from consumers, additional requests from vendors to sell prepaid deals can be accepted and the money sent to the venue. This control allows the marketing company to establish a consumer audience for the deals in one geographical region and then market into new regions. To gain excitement in the new regions the revenue collected from a marketing event could be below the predetermined profit margin in the new region, but brought back from above predetermined profit margins in the established areas.

In one embodiment, a marketing company can also run an add-on interface that allows advertiser node 150 to insert or attach a coupon to the prepaid deal. In one embodiment the add-on interface would allow the advertiser to see the various prepaid certificates in the marketing company's inventory, listing by location and category (bar, restaurant, salon, theater, etc.). The advertiser could then purchase add-on placement for the certificates purchased. This could be in the form of a coupon, attachment to certificate, or add-on codes.

For example, the advertiser could be Budweiser Beer. Bud could purchase 30 add-on coupons (for $5 dollars off case of Bud) from the Marketing Co. for $1 each via the interface. If Marketing Co. maintains the predetermined margin it could, in the example above, reduce the competition price payout by the $1 add-on coupon to set an average of $5 per participant.

In one embodiment, a team can claim a restaurant as its domain and have the right to take on all competitors to its domain. For example, A-Team has won domain of Joe's Bar because its members have all purchased certificates to Joe's Bar from Marketing Co. Any new certificates requested by Joe's Bar and accepted by Marketing Co. could be placed on a competition site and A-Team would fight all competitors. For example, if the competition was a fight where each member of the A-Team was provided with a fortress that could not be penetrated with less than 100 hits and each challenger was given 20 hit capability and 20 health points, the threshold number of the competing team could be set at 6 team members. So in this example B-Team has 6 members and the siege of the fortress begins. Either team can ask new members to join during the battle which can end at a predetermined time—for example 5 minutes. If the B-Team penetrates the fortress they claim Joe's Bar as their domain. In one embodiment players can be set to autoplay so that they can compete without the participant actively controlling the action. If the fortress is penetrated, B-Team would be given a superior deal to A-team. So, for example, A-Team would get $20 certificates for $10 and B-Team would get $20 certificates for $5. By recruiting new players into the competition, a team may receive better deals if they win, and Joe's Bar can get more customers. In one embodiment, players can get additional hit points and/or health points for purchasing items at the bar. For example, buying a round for the table at Joe's Bar could be indicated by a signal sent to the marketing company gaming server 162 by an informing party, for example, the waiter at Joe's Bar. Advertiser's can assist a team or be involved in a competition through the add-on site by paying for the right to provide a team more health or hit points if they purchase their product at Joe's Bar or if they purchase an advertiser deal or certificate. For Example, Budweiser™ could pay to subsidize the certificates won by having the right to insert their $5 off coupon with the competition certificates. Alternatively, Budweiser™ can pay Marketing Co. for the right to double the health points received if Budweiser™ Beer is purchased in Joe's Bar instead of a different brand. While this example has focused on team-based play, it should be understood that these features may be offered to individual players.

Figure 2:
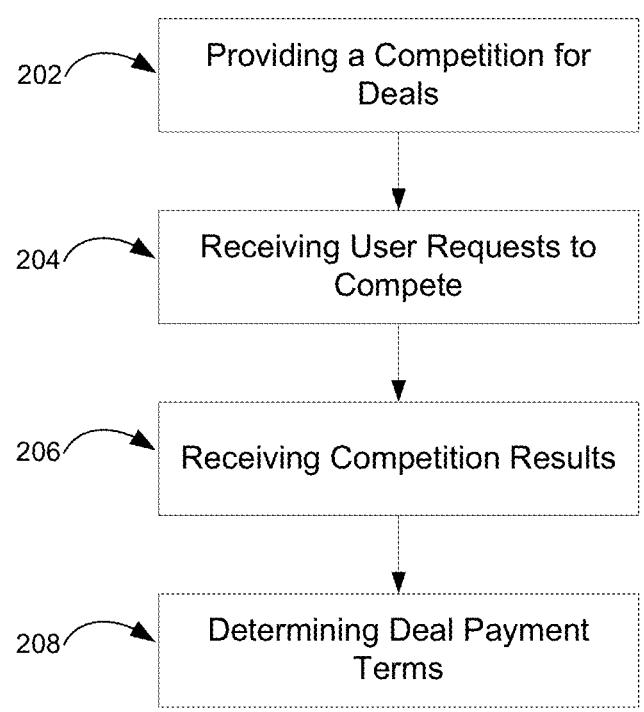
FIG. 2 illustrates one embodiment of a flowchart representative of a deal competition in accordance with the present invention.

FIG. 2 depicts a method of providing a deal competition. Specifically, a stage 202 of flowchart 200 illustrates providing a competition for deals, for example discounted certificates. At least one deal is associated with at least one competition, the association stored for example at gaming server 162. A stage 204 illustrates receiving a user request to compete. One user request may be received, or a plurality. A stage 206 illustrates receiving competition results. Finally, a stage 208 illustrates determining deal payment terms, for example based on the competition results of the competition.

In further respect to flowchart 200, a user payment may be determined based on the determined deal payment terms from at least a portion of the participants. In one embodiment, stage 204 may require the user to pay a user entry deal fee. Deal payment terms may be determined based on the number of user requests. The required user payment may be determined based at least in part upon ranking the participants and associating a payment based on the ranking. The competition and deal may be selected by a user. The participants may be selected by a user. A user may select a private party and be given a link to invite the participants. A competition participant threshold may be set for a predetermined number of participants. The user payment may be further based on a predetermined profit margin associated with the competition. The user payment may be further based on a predetermined profit margin associated with a plurality of deals and associated competitions. The required payment may be displayed for each place in the competition. A score to beat may be displayed during the competition. The competition for the deal may have a specified start time and/or end time. The competition may comprise question answering. The competition may comprise a game of skill. The competition may comprise a game of chance. The user payment may be determined based on a predetermined profit margin associated with one deal. The predetermined profit margin may be associated with a plurality of competitions. The predetermined profit margin may be associated with a plurality of deals. The predetermined profit margin may be associated with a plurality of deals and associated competitions. At least one add-on deal may be associated with at least a portion of the participants. An add-on deal associated with the participants may be based on a competition rank. Flowchart 200 and the additional described embodiments may be executed, for example, on the networks and computer readable storage mediums detailed in telecommunication system 100.

Figure 3:
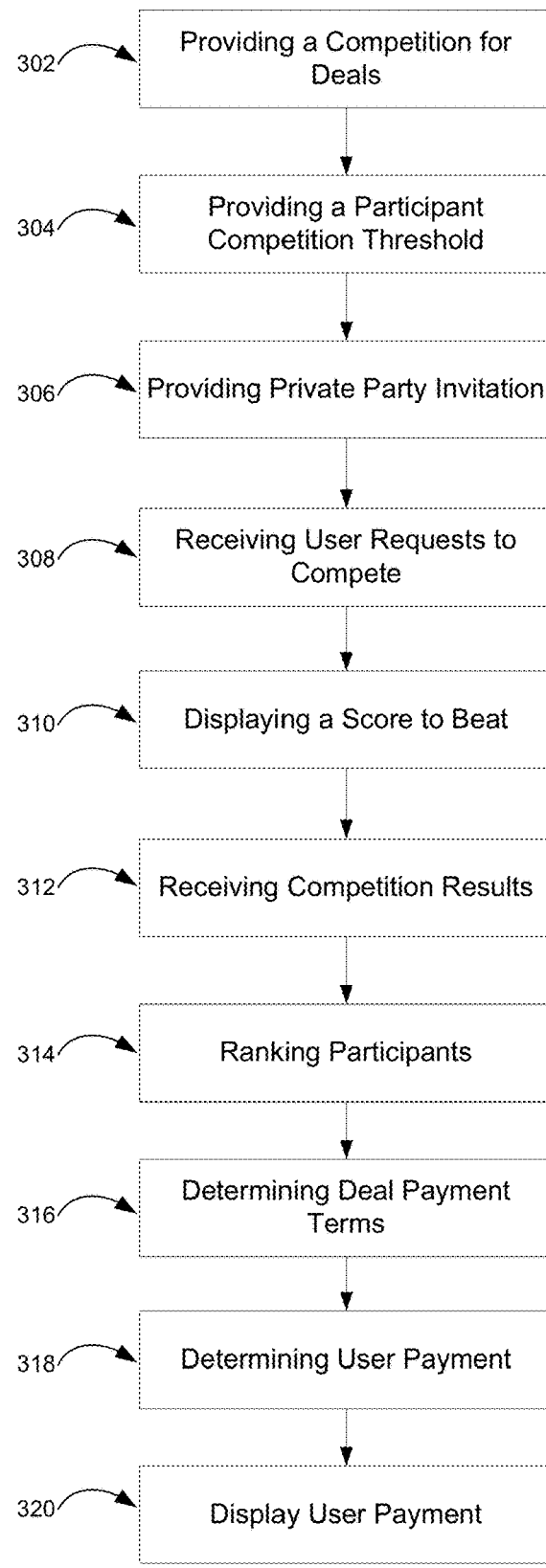
FIG. 3 illustrates one embodiment of a flowchart representative of a deal competition in accordance with the present invention.

FIG. 3 depicts a method of providing a deal competition. Specifically a stage 302 of flowchart 300 illustrates providing a competition for deals, for example discounted certificates. A stage 304 illustrates providing a participant competition threshold. A stage 306 illustrates providing a private party invitation. A stage 308 illustrates receiving user requests to compete. A stage 310 illustrates displaying a score to beat. A stage 312 illustrates receiving competition results. A stage 314 illustrates ranking participants. A stage 316 illustrates determining deal payment terms. A stage 318 illustrates determining user payment. A stage 320 illustrates displaying user payment. Flowchart 300 may be executed, for example, on the networks and computer readable storage mediums detailed in telecommunication system 100.

In one embodiment, deal payment terms are based on the number of user requests. In one embodiment, determining the required user payment comprises ranking the participants and associating a payment based on the ranking. In one embodiment, the competition and deal are selected by a user. In one embodiment, the participants are selected by a user. In one embodiment, a user selects a private party and is given a link to invite the participants. In one embodiment, determining the user payment is further based on a predetermined profit margin associated with the competition. In one embodiment, determining the user payment is further based on a predetermined profit margin associated with a plurality of deals and associated competitions. In one embodiment, the score to beat is displayed during the competition. In one embodiment, the competition for the deal has a specified start time and/or end time. In one embodiment, the competition comprises question answering. In one embodiment, the competition comprises a game of skill. In one embodiment, the competition comprises a game of chance. In one embodiment, determining the deal payment terms is further based on a predetermined profit margin. In one embodiment, the predetermined profit margin is associated with the competition. In one embodiment, the predetermined profit margin is associated with the deal. In one embodiment, the predetermined profit margin is associated with a plurality of competitions. In one embodiment, the predetermined profit margin is associated with a plurality of deals. In one embodiment, the predetermined profit margin is associated with a plurality of deals and associated competitions. In one embodiment, displaying required user payment comprises displaying a required payment for each place in the competition based on the deal payment terms.

Figure 4:
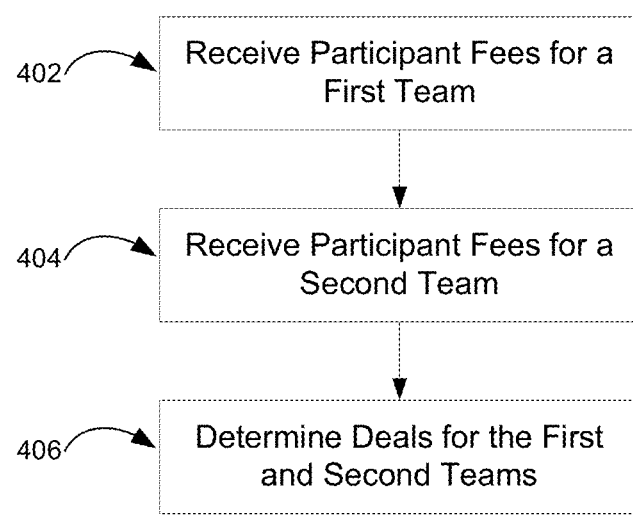
FIG. 4 illustrates one embodiment of a flowchart representative of a deal competition in accordance with the present invention.

FIG. 4 depicts a method of providing a deal competition. Specifically a stage 402 of flowchart 400 illustrates receiving participant fees for a first team. A stage 404 illustrates receiving participant fees for a second team. A stage 406 illustrates determining deals for the first and second teams. Flowchart 400 may be executed, for example, on the networks and computer readable storage mediums detailed in telecommunication system 100.

In one embodiment, the participant fees for the second team of participants are greater than the participant fees for the first team of participants. In one embodiment, the first team fees and the second team fees are determined based on a team loyalty program rating. In one embodiment, the deal competition comprises a battle competition, and wherein health points are added based on loyalty participation. Healthy points may be added based on loyalty participation during a competition. In one embodiment, the health points are added based on loyalty participation during the competition. In one embodiment, loyalty points are sponsored by a third party.

Figure 5:
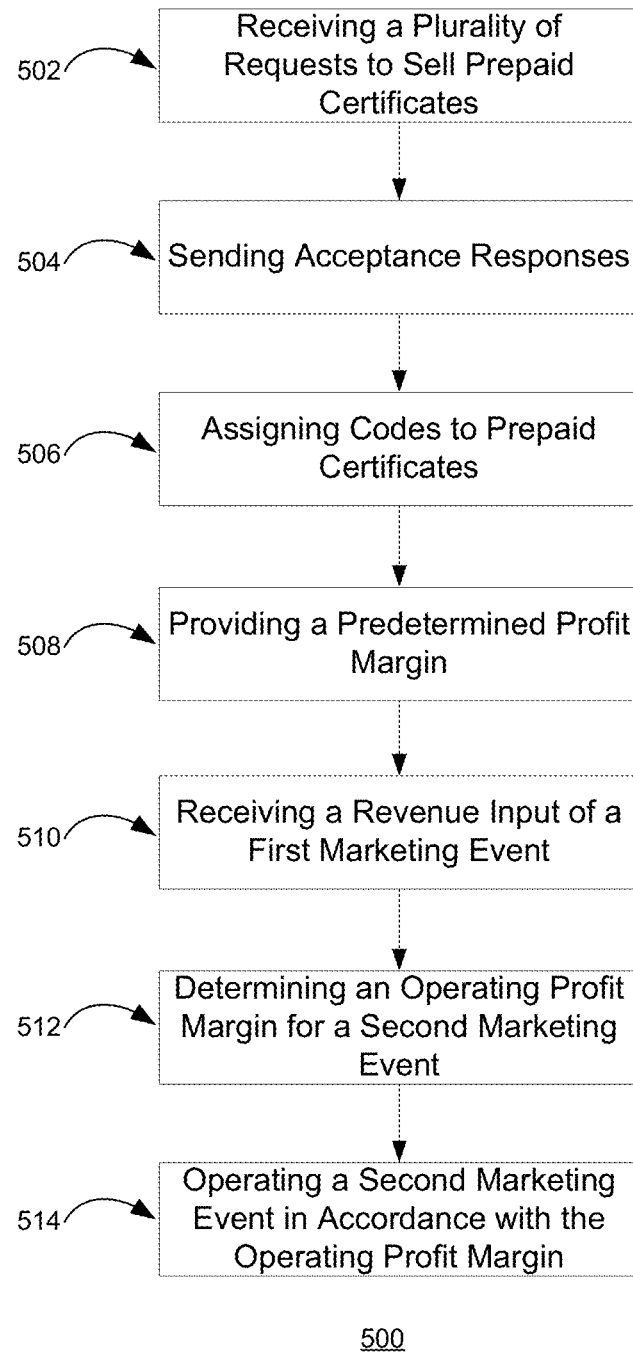
FIG. 5 illustrates one embodiment of a flowchart representative of marketing deals in accordance with the present invention.

FIG. 5 depicts a method of marketing deals. Specifically a stage 502 of flowchart 500 illustrates receiving a plurality of requests to sell a number of prepaid certificates from a plurality of vendors. A stage 504 illustrates sending acceptance responses to the vendors based on the requests. A stage 506 illustrates assigning a code for each prepaid certificate. A stage 508 illustrates providing a predetermined profit margin for sale of the certificates. A stage 510 illustrates receiving a revenue input based on results of a first marketing event. A stage 512 illustrates determining an operating profit margin for a second marketing event based on the received revenue input and the predetermined profit margin. A stage 514 illustrates operating a second marketing event in accordance with the operating profit margin.

In one embodiment, at least one add-on request may be received from an advertiser for a number of add-on advertisements. An acceptance may be sent based on the add-on request. An operating profit margin may be determined for the second marketing event based on the add-on advertisements. The first marketing event may be operated without a predetermined average certificate sale price, for example, a Dutch auction. A type of event for the second marketing event may be based on the revenue input from the first marketing event. Acceptance responses may comprise sending an electronic payment. Some or all of flowchart 500 and the additional described embodiments of that process may be executed, for example, on the networks and computer readable storage mediums detailed in telecommunication system 100.

Figure 6:
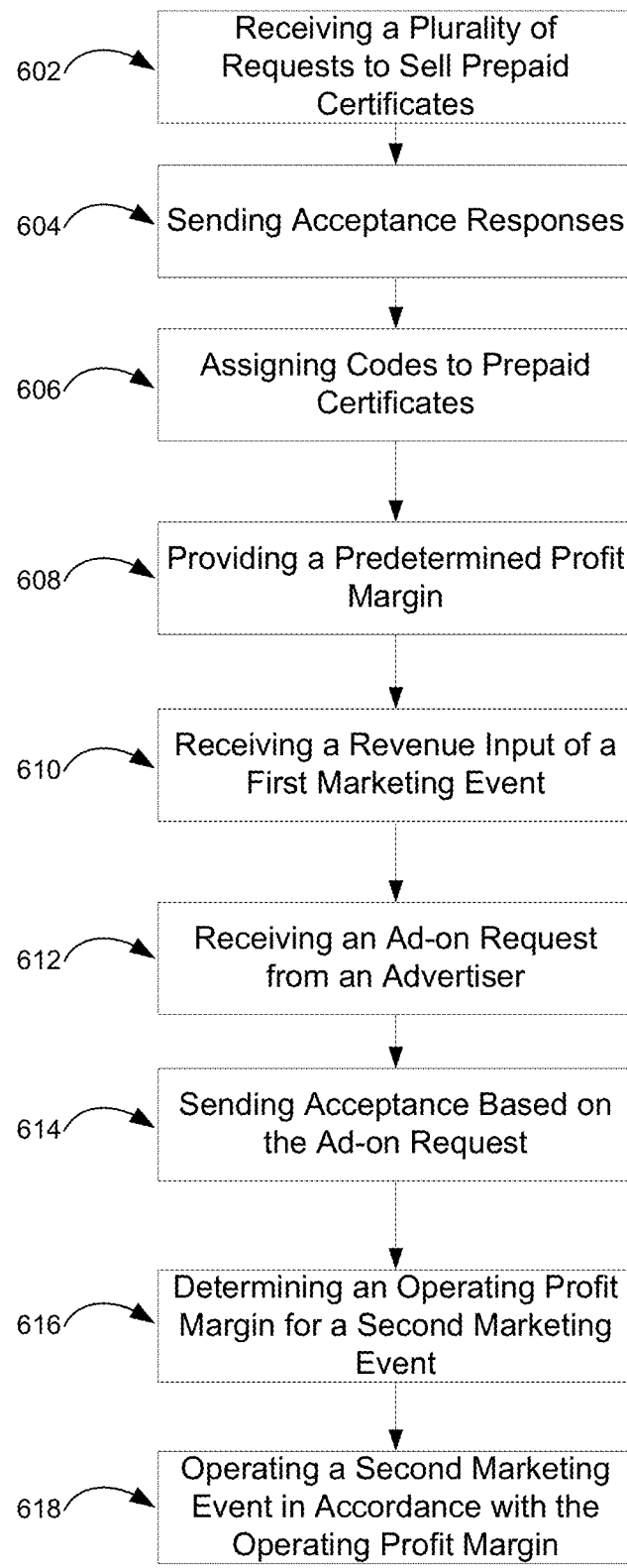
FIG. 6 illustrates one embodiment of a flowchart representative of marketing deals in accordance with the present invention.

FIG. 6 depicts a method of marketing deals. Specifically a stage 602 of flowchart 600 illustrates receiving a plurality of requests to sell a number of prepaid certificates from a plurality of vendors. A stage 604 illustrates sending acceptance responses to the vendors based on the requests. A stage 606 illustrates assigning a code for each prepaid certificate. A stage 608 illustrates providing a predetermined profit margin for sale of the certificates. A stage 610 illustrates receiving a revenue input based on results of a first marketing event. A stage 612 illustrates receiving at least one add-on request from an advertiser for a number of add-on advertisements. A stage 614 illustrates sending an acceptance based on the add-on request. A stage 616 illustrates determining the operating profit margin for the second marketing event based on the add-on advertisements.

In one embodiment, the first marketing event is operated without a predetermined average certificate sale price. In one embodiment, the first marketing event is a Dutch auction. In one embodiment, a type of event for the second marketing event is based on the revenue input from the first marketing event. In one embodiment, sending acceptance responses comprises sending an electronic payment.

Figure 7:
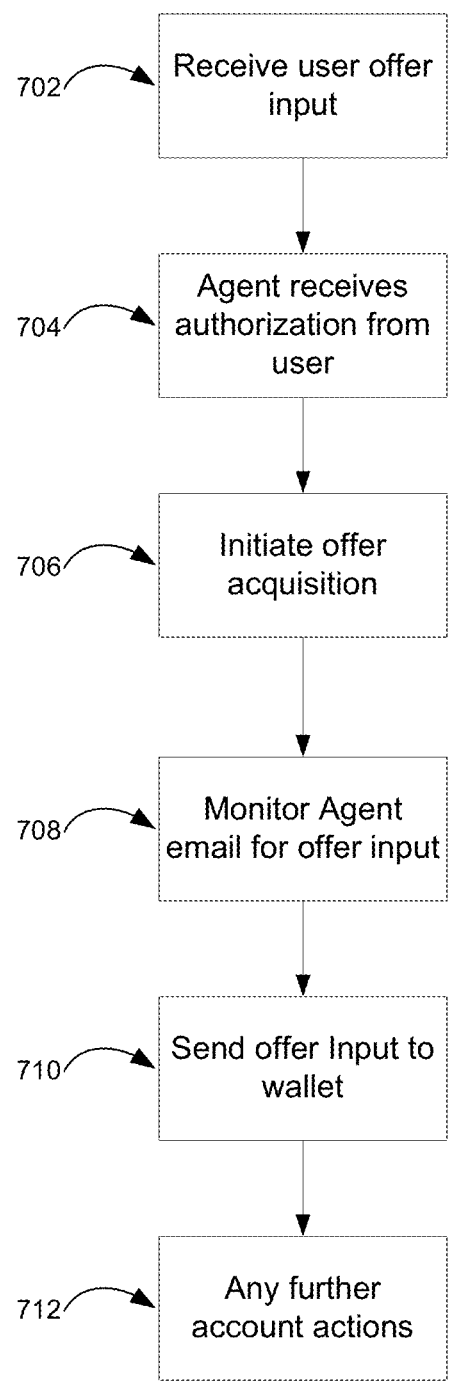
FIG. 7 illustrates one embodiment of a flowchart representative of agent-based offer acquisition.

FIG. 7 depicts a method of agent-based offer acquisition. Specifically a stage 702 of flowchart 700 illustrates a user providing offer input to select an offer, which may include a purchase of a coupon. The user may also choose to flag a deal that is no longer available as a back deal. The back deal may become available if people want to sell them. The offer input or flagging of a back deal is received at the agent service. The agent service sends an authorization request to the user. A stage 704 illustrates a user agreeing to authorize an agent service at an agent server 162 to use personal information to perform necessary actions to acquire offers. The personal information may be used to create an agent email account, signup for offer locations, provide alerts to user, and facilitate smooth financial transactions. The agent service receives the authorization from the user. A stage 706 illustrates the agent service initiates the offer acquisition. For example, the agent service may navigate to the offer location based on offer link, and navigates through forms on the site to acquire deal. This may include a signup process which will pull information from user data storage and populate the signup page. The agent service will also recognize a known account exists for this user with this deal service provider and will log in. The agent service will then assume responsibility for monitoring this account and interpreting transmissions back to the user. Alternatively, the agent service may utilize an API to process the purchase on behalf of the user. A stage 708 illustrates the agent service parsing useful offer information from email transmissions sent to the agent email account from the offer location. A stage 710 illustrates the agent service sending information to an electronic deal wallet location. The agent service is responsible for checking the agent email account for purchased offers information placing offers in the electronic deal wallet. A stage 712 illustrates the agent service performing additional account actions such as alerting the user that an offer has been placed in the electronic deal wallet.

Figure 8:
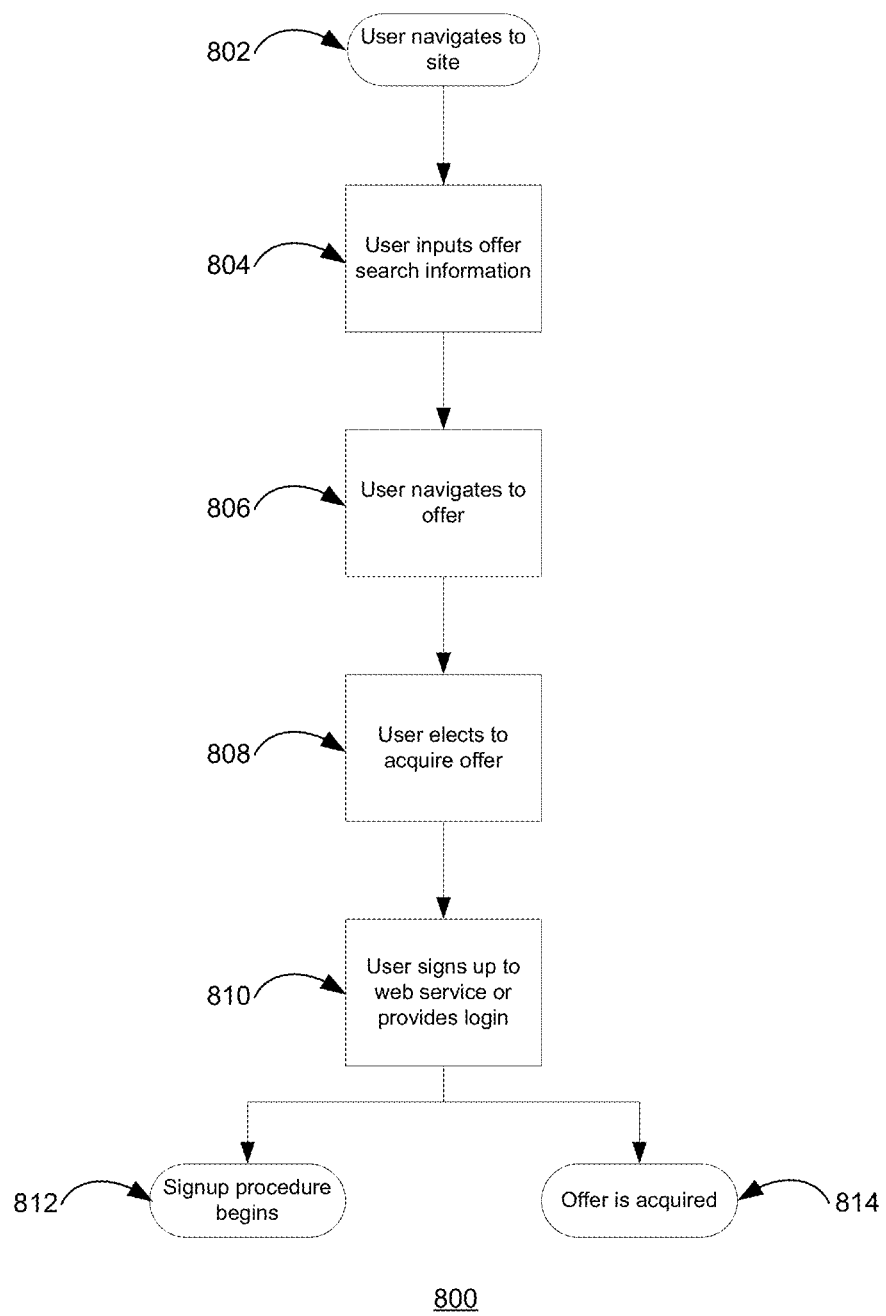
FIG. 8 illustrates one embodiment of a flowchart representative of receiving offer input from user.

FIG. 8 depicts a method of receiving offer input from a user. Specifically a stage 802 of flowchart 800 illustrates a user navigating to an agent-based purchase site hosted by agent server 162. A stage 804 illustrates a user entering searching information. A stage 806 illustrates a user navigating to an offer. A stage 808 illustrates a user electing to acquire the offer. A stage 810 illustrates the user registering with the agent-based purchase service or logging in to an existing agent-based purchase account. If the user has not yet registered, a stage 812 illustrates initiating the sign up process. If the user already has an account and logs in, a stage 814 illustrates acquisition of the offer by the agent-based service.

Figure 9:
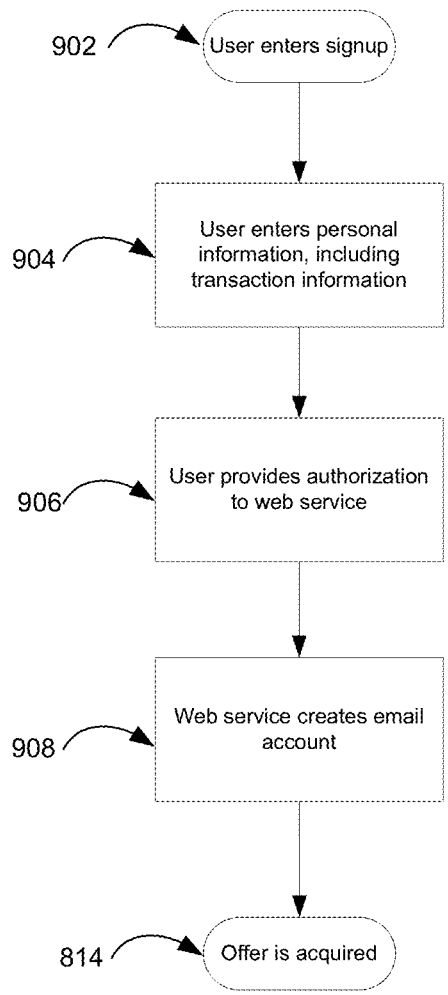
FIG. 9 illustrates one embodiment of a flowchart of processes that occur during the signup and authorization in an agent-based offer acquisition.

FIG. 9 depicts processes that occur during the signup and authorization in an agent-based offer acquisition. Specifically a stage 902 illustrates a user entering a sign up process with an agent-based purchase site hosted by agent server 162. A stage 904 illustrates the user entering personal information including transaction information such as, for example, credit card information. The personal information is received at the agent server. A stage 906 illustrates the user providing authorization to the agent-based purchase service's web service to acquire offers on the user's behalf. The authorization is received at the agent server. A stage 908 illustrates the web service creating an email account associated with the user. A stage 812, as noted in flowchart 800, illustrates acquisition of an offer by the agent-based service.

FIGS. 10A, 10B, and 10C depict methods of email account creation or access. FIG. 10A illustrates one embodiment of a flowchart of an email account creation procedure for agent-based offer acquisition using an external email service provider. A stage 1002 of flowchart 1000A illustrates a web service of agent server 162 beginning an email creation process. A stage 1004 illustrates the web service initiating signup with an external email service, for example a free email service such as Hotmail or Gmail. A stage 1006 illustrates the web service providing information for email signup. This information may include such information as first and last name, phone number, age, location, or the like. Real personal information associated with a user of the agent-based offer acquisition service may be used during email account signup. Alternatively, it may be desirable to keep the associated user anonymous and false information may be provided. A stage 1008 illustrates the web service creating a username and password. The username again may or may not be based on personal information associated with a user of the agent-based offer acquisition service. A stage 1010 illustrates the web service providing a web service managed email account as a backup email account. Some email service providers request or require a backup email account for password resetting and the like. A stage 1012 illustrates the web service responding to any necessary account creation confirmations. A stage 1014 illustrates the web service storing the login information, including username and password, associated with a user of the agent-based offer acquisition service. A stage 1016 illustrates the web service beginning email management of offers received on the account created in this process.

FIG. 10B illustrates one embodiment of a flowchart of an email account creation procedure for agent-based offer acquisition using an internal email service provider. A stage 1002 again illustrates the beginning an email creation process. A stage 1003 illustrates the web service creating an email account on an internal email service, as in an email service managed and maintained by the agent-based offer acquisition service. A stage 1005 illustrates the web service using information for the email creation. This information may or may not be based on personal information associated with a user of the service. A stage 1007 illustrates the web service creating the username. Again, the username may or may not be based on personal information associated with a user of the service. A stage 1009 illustrates the web service storing the email information. Again, stage 1016 illustrates the web service beginning email management of offers received on the account created in this process. In one embodiment, creation of the email account on the internal email service may not require an account to be set up. The email service may not distinguish inbound emails as belonging to different accounts, but simply may parse the entire content of the message and associate the information with the correct user account based on the address to which the email is sent.

FIG. 10C illustrates one embodiment of a flowchart of an email account access procedure for agent-based offer acquisition using an existing email account. A stage 1018 illustrates the web service requesting access to a user's email account. A stage 1020 illustrates the web service receiving access information and credentials, for example from a user. A stage 1022 illustrates the web service using the received information to access the email account. Stage 1016 again illustrates the web service beginning email management of offers received on this email account. In this embodiment, a user of the agent-based offer acquisition service may continue to utilize their existing email address. The web service utilizes POP3, SMTP, IMAP, MAPI or some other protocol to access the user's email, including those emails associated with offers. In one embodiment, the interaction of the web service with the user's email is transparent. Alternatively, the web service may mark as read, flag, categorize, delete, or move to folders those emails it has processed. In this manner, the agent-based offer acquisition service may review offers, place orders, and aggregate purchased offer codes into an electronic wallet, all using the user's existing email account.

FIGS. 11A and 11B depict transaction methods for agent-based offer acquisition. FIG. 11A depicts a method of a direct transaction method for agent-based offer acquisition. A stage 1102 of flowchart 1100A illustrates the web service being instructed to acquire an offer. A stage 1104 illustrates the user selecting a transaction method. A stage 1106 illustrates the web service performing the transaction based on the user selected method. A stage 1108 illustrates the web service forwarding information in a receipt email associated with the purchase to the user. A stage 1110 illustrates the web service waiving responsibility for any compromised information related to the transaction. For example, an interface may indicate to a user that they must agree that the agent-based offer acquisition service is not responsible for any misuse or abuse of the payment information used in the transaction. Stage 1110 may be required prior to the transaction being initiated, or the waiver may be provided at some other point, for example in association with the receipt information. Stage 1112 illustrates completion of the transaction. Stage 1114 illustrates the web service parsing emails sent to the managed email account for offer information.

FIG. 11B depicts a secure transaction method for agent-based offer acquisition. Stage 1102 again illustrates the web service being instructed to acquire an offer, and stage 1104 illustrates the user selecting a transaction method. A stage 1105 illustrates the web service receiving payment from the user. In one embodiment the process may then continue to a stage 1107 wherein the web service makes payment for the offer on behalf of the user and receives no additional fee. In an alternative embodiment, the process may continue from stage 1105 to a stage 1109 which illustrates the web service making payment on behalf of the user and receiving a fee. The additional fee may be charged from the payment submitted by the user, or may be received from the offer service, for example through an affiliate program. A stage 1111 illustrates the web service providing acknowledgement of the transaction. A stage 1113 illustrates the web service accepting responsibility of the security of the transaction. Again, stage 1112 illustrates completion of the transaction, and stage 1114 illustrates the web service parsing emails sent to the managed email account for offer information.

FIG. 12 depicts a method of an email filtering and parsing procedure controlled by an agent-based offer acquisition web service. A stage 1202 of flowchart 1200 illustrates the web service finishing email creation. A stage 1204 illustrates the web service creating filtering rules for acquired offers. Filtering rules may be based on the offer site, or based on preferences provided by an end user. A stage 1206 illustrates receiving an email at the web service, for example an email from an offer site sent to a managed email account. A stage 1208 illustrates the web service parsing the email for information deemed important based on the filtering rules. A stage 1210 illustrates saving at least a portion of the parsed information. A stage 1212 illustrates sending at least a portion of the information to a user's wallet. A stage 1214 illustrates a user accessing the wallet and the provided information.

FIG. 13 depicts a method of offer organization within an offer wallet. A stage 1302 of flowchart 1300 illustrates a user entering the user's wallet. A stage 1304 illustrates the web service placing parsed offers into a preexisting wallet organization. The preexisting wallet organization may be, for example, to indicate which offers are used, unused, expiring, expired, for sale, or other categorizations as may be helpful to the user. A stage 1306 illustrates an existing offer that is flagged for having an upcoming expiration date. A stage 1308 illustrates the user selecting an offer from the wallet. If the user is electing not to use the offer, but to sell it, the process progresses to a stage 1310 wherein the user flags the offer to be resold. Then at a stage 1312 the offer enters a resell function. If the user elects to use the offer, or after the offer enters the resell function, the process progresses to a stage 1314 wherein the offer is removed from the wallet. Removing the offer from the wallet may comprise changing its place in the preexisting organization, or removing it entirely. A stage 1316 illustrates the user exiting the wallet.

FIG. 14 depicts a resell function associated with an offer wallet. A stage 1402 of flowchart 1400 illustrates an offer entering the resell function. A stage 1404 illustrates a web service connecting the offer to other users requesting an offer. The other users may be requesting that specific offer, or requesting an offer in general. The other users may be requesting the offer in advance of the offer entering the resell function, or they may request the offer after it is available. A stage 1406 illustrates notifying the user who provided the offer to the resell function of the sale of the offer. A stage 1408 illustrates transferring payment to that user. A stage 1414 illustrates notification appearing in the offer wallet. A stage 1416 illustrates removal of the offer from the resell function.

FIG. 15 depicts a method of responsibility transfer of agent-managed offer site accounts. A stage 1502 of flowchart 1500 illustrates a user selecting to change account rights. A stage 1504 illustrates a web service initializing account management. A stage 1506 illustrates the user selecting management settings. In one path, the user selects partial privilege at stage 1508. The web service then changes privilege levels based on the user selection at stage 1510. At stage 1512 normal agent-based acquisition operation resumes. In an alternate path, after stage 1506 the user selects to have full power at stage 1514. A stage 1516 illustrates the web service removing its privileges associated with the account. For example, the web service may delete the account information including username and password from its database. A stage 1518 illustrates the user receiving full privileges to the account. For example, the web service may have provided the username and password information to the user. A stage 1520 illustrates termination of the web service responsibilities in relation to the account.

In one aspect, the invention features a web service that allows for users to navigate to desired offers and once selected can use a user's personal information, entered by the user, to acquire offers online by easing the effort required by the user. When the user signs up for the service, they would input multiple fields of information requested by the service. The service can change the requested fields to meet the signup requirements of other sites if necessary. For offer acquisition requiring signup, the service can pull the personal information to fill in the necessary fields. The service will also be in charge of managing previous logins and signup information to make offer acquisition faster.

Embodiments of this aspect of the invention include the following features. In one embodiment, the service creates an email for use by the service to represent the user within the service's system. In another embodiment, the service collects transaction based information to acquire offers that require a purchase. In another embodiment, the service can create information to fill required fields if necessary on offer sites.

In another embodiment, the web service creates an email for the user to be managed by the service from a free online email service. The web service can sign up for the email client, confirm email creation responses, and retain all login information for the email client. In another embodiment, the web service can transfer the email account to be transferred for use by the user. In another embodiment, the web service creates the email under its own domain name. For example, the web service may have access to a Microsoft Exchange server, or some other email server that is managed by the same entity. The web service has complete control over the account but is unable to offer the email to be used by the user at a later date.

In another embodiment, the email account can be used to sign up to offer locations requiring an email. The email is then used to hold all communication between the offer site and web service. The web service then becomes the mediator between the email account and the user. This includes using the email and personal information to sign up to offer locations.

In another aspect, the web service is responsible for all offer transactions on behalf of the user. The web service includes the capability to aid in the transaction process for acquiring offers from multiple locations. The web service is responsible for helping create a secure transaction by verifying the offer location's trustworthiness before the acquisition.

In another embodiment, the web service stores transaction based information such as credit card information, pay pal information or other method of pay. In one embodiment, the web service uses the user's transaction information to acquire the offer. The web service would then not be responsible for the secure transfer of information on the offer location site or location. In another embodiment, the web service would mediate the transaction by receiving payment from the user and acquiring the deal with the web services funds. This would allow for the user to keep their transaction information from being used at the offer location. The web service would then be responsible for any compromised information.

In another aspect, the web service manages the created email account for the user. The web service is in charge of managing the account for all functions pertaining to offers, maintenance, and termination of the email account. In one embodiment, the web service manages filters and rules to sort offer information. The web service sets filters to separate offer spam and offers the user requested. The filters separate the emails based on specific characteristics of the emails sent by the offer sites. This can be done through the address of the sender, the content of the email, or the timestamp of the email. In another embodiment, the web service parses important emails for information relating to selected offers. The web service parses the emails for information such as the offer code, specific dates for the offer, offer title etc. set by the web service. The web service receives the parsed information and sends it to the organized wallet area for the user to use.

In another aspect, the web service creates a wallet or collection for the offers the user acquired. The wallet holds all purchased offers and selected offers that the user had specifically selected. The web service provides the wallet location to keep track of the offers for the user to access quickly. The web service can organize the offers for the user based on specific criteria. The web service allows for offers to be displayed in a number of different standards including QR codes, barcodes and any new technology when available. In one embodiment, the web service allows for offers to be resold to other users through a resell program in which the offer can be sold to other users of the web service. The web service also allows for the user to flag offers that other users may resell. In another embodiment, the web service allows the user to share deals with other individuals. The user can chose to share the deal with whomever they choose. In another embodiment, the web service notifies the user of the status of their offers. The web service notifies the user through any number of mediums to get the information to the user.

In another aspect, the web service allows for the email account and information to be transferred from the web services control. This includes multiple levels of account management, depending on the request of the user. In one embodiment, the web service allows for the email privileges to be shared between the user and web service. This allows for the user to filter through other offers and select more offers than given through the web service originally. In another embodiment, the web service terminates all responsibilities and gives full privileges to the user. The user would then manage the email account and lose functionality of the wallet, email parsing, and all other responsibilities of the web service.

Users may select offers based on location or personal preferences, or they may be selected based on previous offers they have purchased, or based on offers that become available through reselling functions. The agent-based offer acquisition provides a safe method of providing personal and transaction information to one trusted source. The user may avoid providing their email address to many different offer sites because the agent-based offer acquisition service creates and manages a proxy email on their behalf that is used to register with offer sites. The agent-based offer acquisition service then filters useful information coming to that proxy email address and delivers it to the user, either by email, via a website, an app, through a digital offer wallet, or the like. If the user wishes to take control of the proxy email address, they may do so using the method previously described.

One embodiment of the present invention incorporates a concierge based method for delivering deal information to a user, for example running on a concierge offer server 162. A method of concierge offer management may comprise the following steps. Entertainment suggestion input may be received by the concierge system. The concierge system searches for entertainment items based on the request. A number of suggestions to return is determined. The selections presented are prioritized based on offer availability and proximity. In one embodiment, selections may be prioritized based at least in part on payment received from an advertiser. For example, an entertainment venue may pay to be the first recommended suggestion. Alternatively, a vendor who provides a product, for example Budweiser®, to an entertainment venue, for example Joe's Bar, may pay to have the venue in which their product is sold appear as the first recommended suggestion. Payment may also be made to provide a visual or audible distinction between the paid listing and unpaid listing.

The concierge system may receive deal request input from the user. Deal request input may include specification of time, entertainment or service type, whether the request is for a date or a casual occasion, location, cuisine, number of attending parties, price range, and other information that may be used in selecting a deal. For example, a user of the deal concierge system may provide deal request input indicating they are interested in having dinner on a particular evening after work. A variety of devices and methods may be used to provide deal request input. For example, a user may use a standard desktop, laptop or tablet computer to provide deal request input via a website or an installed program. Using a mobile device, such as a phone, a user may provide deal request input via an installed app, by speaking into a program such as the Siri program provided on the iPhone, by text message, or again via a website.

When the concierge system receives deal request input, a wide variety of deal sources may be reviewed for consideration. These deals may be indexed by the concierge system in advance of receiving the deal request input. Alternatively the concierge system may conduct a real-time review of deal origination sites and services upon receiving the deal request input. Based on the time indicated in the deal request input, the concierge system may consider or eliminate deals from within categories including advance purchase required daily deals, purchasable instant deals, specials or coupons, or a custom negotiation process may be initiated.

The concierge system may, as noted, include a deal request input indicating entertainment or service type. In one embodiment, the concierge system may be configured to provide access to deals for movies, plays, other arts, restaurants, clubs, bars, professional sports matches, massages, pedicures, other personal services.

The concierge system functions to provide a user with customized entertainment or service options, which will be referred to as concierge suggestions. Concierge suggestions may be provided in response to receiving deal request input. Alternatively, concierge suggestions may be provided proactively to a user. For example, a user may have a mobile device that provides updated information to the concierge system indicating the user's location. Based on the user's location, and in one embodiment based on stored user preference information, the concierge system may provide suggestions to the device. The device may vibrate or provide an audible alert indicating the availability of one or more concierge suggestions. Alternatively, one or more applications, or for example a tile on a Windows Phone, could be updated to display concierge suggestions should the user access the application or view the tile on the device. A wide variety of input methods may be used to indicate acceptance of a concierge suggestion. A user may click a link, a button, speak a command, or provide some other concierge suggestion acceptance input.

In one embodiment, the concierge system may provide the user with a calendar entry for an accepted concierge suggestion, for example by emailing an .ics or .vcs file. In one embodiment, the concierge system may be provided access to an account on a calendar service associated with the user. Upon receipt of concierge suggestion acceptance input, the concierge system may create a calendar entry associated with the suggestion. The calendar entry may include time and location associated with the accepted suggestion, and additionally may include a link to information associated with the suggestion. In one embodiment, an invitation associated with the calendar invite may be sent to other parties that will participate. Sending the invitation may be done by the user using the calendar service, or alternatively the concierge service may receive an invite instruction and send the invitations without the user directly interacting with the calendar service.

When the concierge system is provided access to a calendar service, the calendar service may provide an additional source of deal request input. For example, if a user has a calendar entry indicating that the user will be attending a play at a certain theater on a certain date and time, the concierge system may provide a concierge suggestion related to a dinner deal available at a location near the theater. If the user accepts the concierge suggestion, the concierge system may access a reservation service provider and book the dinner.

Further, based on calendar information, the concierge service may receive a request or volunteer a suggestion for a transportation service. The transportation service suggestion may be a recommended route using public transportation, or the suggestion may be for the user to utilize a taxi or limousine service. Suggestion acceptance input related to a transportation service suggestion may initiate several concierge service actions. For example, route and timing information associated with the suggestion may be added to an existing calendar entry, or an additional calendar entry may be created. Also, the concierge service system may interface with a taxi, limousine, or other transportation dispatching service to schedule the transportation. Confirmation numbers or codes related to the transportation reservation may be stored in the concierge service and may be provided in a calendar entry.

In one embodiment, the concierge system may provide food order information in addition to providing a reservation. Continuing the example of the user who has accepted a dining concierge recommendation in advance of a play, the concierge system may note that a limited period of time is available between the reservation time and when the play begins. The concierge system may then provide food order information automatically or based on input from the user. Food order information may be provided as a note associated with the reservation, or alternatively a reservation or ordering service may be provided associated with the restaurant and utilized by the concierge system.

In the event that an accepted concierge suggestion is associated with an advance purchase required daily deal, the concierge system may incorporate or utilize an agent-based offer acquisition service.

Concierge recommendations may be prioritized based on a variety of factors. For example, prioritization may be based on proximity, based on deal type, based on trustworthiness of the offer, based on the total amount of money that will be saved by the user, based on the total amount of money that will be saved by all participating parties, based on the percentage savings by the user, based on the percentage savings by all participating parties, based on reviews or ratings associated with the venue or service, based on what the user has done and enjoyed, based on what all participating parties have done and enjoyed, based on what the user has not done, based on what all participating parties have not done, based on past user interaction, feedback, or participation with the recommendation, or based on some combination of these and other factors. As noted previously, prioritization may be based on payment received from a venue or vendor. In one embodiment, the payment required to be a top recommendation may vary based upon other factors such as, for example, on past user interaction, feedback, or participation with the recommendation.

As previously noted, one source of concierge recommendations is a custom negotiation process. A custom negotiation process is an interaction with a venue or service provider to request a deal that is not published to the public at large. The concierge system provides custom negotiation input. The venue or service provider received the custom negotiation input. The venue or service provider evaluates the custom negotiation input and may return a custom negotiated deal. Custom negotiation input may include an identifier associated with a user, number of persons in the party, specific service request information, guaranteed expenditure amount, or other information stored by the concierge service or provided by the user. By providing an identifier associated with the user, the venue or service provider may track patronage and provide custom negotiated deals based on that patronage, or based on the potential of attracting a new patron.

The concierge system may be provided to end users based on a variety of revenue models. The concierge service may be provided based on a one-time fee, or a fixed periodic fee paid by the end user. The concierge service may charge a fixed or variable transaction fee from the user for accepted suggestions. For example, a variable transaction fee may be based on the service utilized. Purchasing an advanced purchase required daily deal may incur one fee, where booking a reservation may incur a different fee. Variable transaction fees may also be based on the total amount spent or the amount saved by the end user. Alternatively, or in addition, the concierge system may receive fees from venues or service providers. In one embodiment a fee may be received from a venue or service provider for providing a suggestion related to that party. Alternatively, or in addition, a fee may be received for accepted suggestions related to that party. Similar calculations may be used for variable transaction fees. A venue or service provider may pay a premium fee for a suggestion accepted by a new patron.

One embodiment of the present invention includes a method for managing deliveries, for example of food orders to consumers. FIG. 16 illustrates a flowchart representative of one embodiment of a method for managing deliveries at 1600. A plurality of delivery pick up requests is received associated with a plurality of venues at 1602, each of the delivery pickup requests including a venue name, a pick up time, and a customer address. Drop off times are determined for each delivery at 1604. A plurality of delivery node locations is received at 1606. At least one route is determined for at least one of the delivery nodes at 1608. Orders for delivery may be received from a variety of devices, such as a computer 124, phone 126, tablet 128, or other device connected to network 100.

Deliveries may be received and processed at delivery service provider node 160. In one embodiment, delivery requests may be sent directly from user node 120 to delivery service provider node 160. Alternatively delivery requests may be sent from user node 120 to a restaurant advertiser node 150 that has offered food delivery, and from restaurant advertiser node 150 delivery pick up requests may then be sent to delivery service provider node 160.

Drop off times may be determined based on pick-up time and the customer destination. Drop off times may be determined based on a route including a plurality of pick up times, pick up locations and destination locations. Drop off times may be padded for a variety of reasons, such as to allow for promotional product sales and delivery. Drop off times may include calculations based on traffic service provider server 162.

Earliest possible pick up times may be calculated based on the pickup location, for example a restaurant may have an average time to prepare an order. Alternatively, earliest possible pick up times may be calculated based on the items ordered for delivery, for example it may be based on the time it takes to prepare the ordered item with the longest preparation time. Earliest possible pick up time may also incorporate a preparation queue and preparation capacity. For example, the queue could be based on the total delivery orders in the system, or if all orders including in-house orders are stored, for example, in a point of sale system, then the entire queue of all preparation needed may be incorporated into the preparation queue. Preparation capacity may be determined in a variety of ways, including based on historical capacity, based on the number of cooks available, or based on the specific cooks available.

Delivery routes may be determined based on a variety of factors and algorithms. For example, the fastest route might be calculated based on a road mapping service provider 160. In one embodiment, the fastest route calculation may take into account traffic data, such as that provided by the Waze application. Alternatively, an estimated or actual calculation of the cost of the delivery may be used to determine the route. Cost calculation may take into account the shortest distance, to account for fuel costs, the cost of tolls, the cost of driver time, the cost parking during certain timeframes, and the like. Another factor that may influence the route determination is prioritizations for specific customers that will receive the delivery. Or alternatively, prioritizations for specific product providers, such as restaurants. In one embodiment, the route may be calculated based on the probability of receiving additional delivery requests with pickup or drop-off locations already on the route, or proximate to the route.

FIG. 17 illustrates a flowchart representative of one embodiment of a method for managing deliveries including route adjustment based on additional delivery requests at 1700. A plurality of delivery pick up requests is received associated with a plurality of venues at 1602, each of the delivery pickup requests including a venue name, a pick up time, and a customer address. Drop off times are determined for each delivery at 1604. A plurality of delivery node locations is received at 1606. At least one route is determined for at least one of the delivery nodes at 1608. At least one additional delivery request is received at 1702. At least one route is updated for at least one delivery node at 1704.

In one embodiment, an additional delivery request may be a modification or cancellation of an existing delivery order. Recalculation of the route may be done in the same method as original calculation. Alternatively, the route may only be adjusted if the drop off times for existing orders are not impacted. In one embodiment, drop off times may be communicated to user 122 and may include padding to allow for delays or delivery adjustments. The drop off time communicated to the customer may be a range of times in which the delivery is expected to take place.

FIG. 18 illustrates a flowchart representative of one embodiment of a method for managing deliveries including providing notifications to consumers at 1800. A plurality of delivery pick up requests is received associated with a plurality of venues at 1602, each of the delivery pickup requests including a venue name, a pick up time, and a customer address. Drop off times are determined for each delivery at 1604. A plurality of delivery node locations is received at 1606. At least one route is determined for at least one of the delivery nodes at 1608. At least one notification is sent out to at least one user at 1802. At least one additional delivery request is received at 1702. At least one route is updated for at least one delivery node at 1704.

In one embodiment of the present invention, proximate delivery notifications may be sent to users of a delivery service. For example, a message could be delivered to potential consumers stating, for example, "A delivery of Papa John's pizza is going to be made in your neighborhood in the next hour. Would you like to order a pizza?" Proximate delivery notifications may be generated based on the venues and the delivery route. Further, such notifications may be sent to only targeted individuals, for example, those users who have ordered from one of the pickup venues for the current route in the past. In one embodiment, the notification may require that an order by placed within a predetermined period of time. The notification may specify a discount if an order is placed. For example, the discount could be free delivery. The notification may specify that an order must be made from a predetermined list of one or more specific items. In one embodiment, an order is received based on the notification. The order based on the push notification may then be associated with the pickup time at the associated venue. Notifications may be sent directly to specific individual, for example by email, text message, or the like. Alternatively, notifications may be broadcast over some limited geography, for example via radio, television, or within range of some other broadcast signal source such as a cellular tower.

A pizza company employs an RDI. The pizza company is a national chain that has used banner advertising on Yahoo!® in a TAWS system to build their brand and to send store specific promotional advertisements to users who have been multiply confirmed as being within the delivery zone of a store. The TAWS system is run on a TPAS that employs the previously described optimization system. The optimization system has identified an optimization profile that indicates high response rates for male college students. Cross-referencing the times having the highest response rates with a television schedule it is determined that response rates are highest an hour before Fresh Prince of Bel Air reruns. The pizza company uses this information to send out offers over an IAP network to students running IAPs at a local university. The offer takes the form of a short trivia game, winners receive two dollars off a pizza order. Two students win the trivia game. The first student selects to have a two dollar off coupon sent to their cell phone in the form of a bar code, and they go to the store to redeem the offer. The other winner places an order for their pizza over the IAP. The RDI at the pizza company receives the order and recognizes the student's address as a dormitory. The RDI then signals the IAP server to send out dollar off coupons to all students in that dormitory who respond within a set period of time, for example 5 minutes. This has the effect of more efficiently delivering pizza, as multiple orders may be placed from the same delivery location. Alternatively, the RDI may send a signal to the IAP server that prompts discount advertising to users in the dorm and surrounding areas with a longer redemption period, for example 20 minutes. The pizza delivery person takes 5 extra pizzas with them in anticipation that additional orders will be received in the same area. When orders are placed in that same area and received by the RDI, the RDI signals the delivery person with the additional delivery information via cell phone, blackberry, pager or some other wireless means of communication.

Consumers who utilize a product delivery service may be categorized as active consumers or passive consumers. An active consumer is one who makes a delivery request based on a need they themselves recognize and make independent of a proximate delivery notification. A passive consumer is one who places an order for delivery based upon a proximate delivery notification.

FIG. 19 illustrates one embodiment of a flowchart for managing deliveries including providing notifications to consumers at 1900. At stage 1902, at least one delivery request is received from a user at a user location. For example, an order for pizza. At stage 1904, at least one promotional product is determined for inclusion on a delivery entity associated with the user delivery request. For example, two extra pepperoni pizzas. A target area is determined based on the user location at stage 1906. For example, the target area might include the area within two blocks of the delivery route or destination. At stage 1908, proximate delivery notifications for the promotional product are sent to potential customers within the determined target area. At stage 1910, a delivery request is received for the promotional product. At stage 1912, it is determined whether any additional promotional product remains. For example, one of the two pepperoni pizzas may still not have been sold. If unsold promotional products remain, a new target area may be determined based on the order received for the promotional product, returning to stage 1906. At stage 1914, the products are delivered. A delivery schedule or route may be adjusted based on the received promotional product requests. The target area may be adjusted based on an adjusted delivery schedule or route, and notifications may be sent based on the adjusted target area. For example, when a passive consumer purchases one of the pepperoni pizzas that have been included in the delivery as promotional product, the target area may be adjusted based on the passive consumer's address, and a second set of notifications may be sent based on this adjusted target area. Notifications may be sent during the delivery to the user location. The promotional product may be determined in a variety of ways. For example, the promotional product may be determined based on a product profile associated with the target area. The promotional product may be determined based on purchase history, demographic, and location information. For example, the purchase histories of the customers within the target area may be used in determining the promotional product.

A notification may be sent to a user who already has an outstanding order in the system. Such a notification may suggest an add-on to the existing order. For example on a dinner order, the notification may suggest dessert. The notification may be sent based on the time of day of the order, the venue from which the original order was placed, the type of items on the original order, one or more of the current delivery routes, the customer profile, or other factors. The customer profile may trigger a notification based on the customer's past order history, based on the customer's previous responses to notifications, or the like. One or more of the current delivery routes may trigger a notification based on the existing venues on the route or based on venues proximate to the route.

In one embodiment, two or more delivery nodes may make an exchange of orders. For example, a customer may order a pizza from Joe's Place. Then the customer receives a push notification suggesting she order gelato from The Gelato Palace. She places an order for gelato based on the notification. Driver A picks up the pizza order while Driver B picks up the gelato order. A handoff location is established, for example based on the crossing of their current routes or based on the closest point between their routes. Alternatively, a handoff location can be a one of a set of fixed locations, or delivery hubs. At the handoff location, Driver B gives Driver A the gelato for delivery with the pizza. A handoff may be an exchange where each driver gives and receives on or more orders. A handoff may include more than two drivers.

Methods of managing delivery may incorporate one or more delivery coordination interfaces. For example, delivery vehicles may include wirelessly connected tablets mounted to the dashboard. The interface may indicate the current route on a map, including the GPS location of the delivery vehicle and provide turn by turn instructions. The interface may indicate each of the pickup, delivery, and hand off points. The interface may also indicate the times associated with each of these points. The delivery personnel may be provided with a feedback mechanism within the interface to indicate a delivery delay, for example including how long is anticipated for the delay and the cause of the delay. A delay may be based on a food order not being ready when the driver reaches the pickup point. The delay is entered into the system and the system may recalculate the times and routes for that delivery node and other delivery nodes.

By way of another example, push notifications may be sent to potential consumers based on weather conditions, time of day, or the like. If a delivery node has a route that will take it close to Sam's Soup, the delivery service may have a notification rules engine that determines it is during the hours recognized as dinner time and the temperature is below sixty degrees Fahrenheit. On these determinations a notification may be sent to customers along the current route suggesting they order soup and noting that delivery will be quick.

In one embodiment, the delivery service may be integrated with a social network service. On receiving an order from a user, the delivery service may check the friend profiles of the user, including, for example, what the friends have liked. Based on one or more friend profiles, a push notification may be sent to the ordering user making a recommendation based on the friend profile. Alternatively a push notification may be sent to the friend based on what the ordering user purchased. For example, recommending they make the same purchase.

As noted, push notifications may include a discount. Discounts may be specified directly by the venue, by the food ordering service, or by the delivery service. In one embodiment, discounts may be automatically calculated based on a desired margin across multiple customer orders. The margin may be determined across customer orders from a single venue, from a chain of venues, a group of venues in an area, or all venues.

Delivery coordination service provider 160 may coordinate delivery of prepared food from restaurants, food from grocery stores, other products from retail or warehouse locations, or indeed any person or thing requiring delivery from one location to another location. Delivery coordination service provider node may employ or coordinate with multiple delivery service provider nodes 160 that may be, as previously noted, manned or un-manned vehicles, robots, bicyclists, or the like. The delivery service node may work in conjunction with the delivery source or may work entirely on behalf of the delivery recipient. For example, a delivery recipient could request delivery from a restaurant that provides pick-up but not delivery service.

In one embodiment, a delivery service provider node 160, or simply more simply a delivery node, may not provide delivery on a full-time capacity. For example, a family vehicle, typical used for commute to and from school or a non-delivery related job may at times be employed as a delivery node. In this manner, the delivery node may be an individual user 120 registered as or serving as a delivery node 160. The individual user may not be a professional delivery person. A telematics unit onboard the vehicle may include a program that allows the driver of the vehicle to designate that it is available for providing deliveries. Alternatively, a separate device such as a cell phone or tablet computer may be used to designate that the vehicle is available. Such designation may be termed a delivery node availability indicator. The delivery node, be it a robot, vehicle, or person on foot, may have a deliver node availability indicator set to a variety of statuses such as unavailable (inactive), unavailable (utilized), available (passive), available (active). A node may be unavailable because the person or vehicle may be performing a non-delivery function and not wish to be notified of delivery opportunities, or the node may be unavailable for delivery because it is already in the midst of a delivery. A node may be available and actively looking for delivery opportunities, or may be available but only passively waiting for certain opportunities. In one embodiment, the status of the delivery node availability indicator may be set programmatically to adjust based on date and time. In one embodiment, delivery opportunities may be pushed to user node 120 when they are not in an available status. For example, the delivery service coordination node may send an email to an individual while they are at the grocery store, the email may note that a grocery order at that store is prepared for delivery to their next door neighbor. In another embodiment, the delivery coordination service may not utilize a delivery node availability indicator, but simply publish the delivery opportunities and coordinate based on responses. By way of another example, when an individual is checking out at a grocery store, the check out process could prompt the notification that a delivery opportunity is available from that store to their next door neighbor.

In one embodiment, a delivery node may have an associated set of delivery service capabilities. For example, a delivery node may be able to only carry up to a certain amount of weight. Another example is that some delivery nodes may be equipped with insulated cargo areas for delivering products that must remain hot. Another example would be a delivery node equipped with refrigeration. A delivery node may also only be able to deliver to certain locations or at certain speeds. For example, a bicycle has a different delivery service capability with respect to speed than does a person on foot or a car, and an unmanned flying drone may reach certain locations that a car or bicycle cannot.

In order for user node 120 to be recognized as a delivery node by the delivery node coordination service provider, the user may be required to register as a delivery node. Registration as a delivery node may be done on delivery coordination service provider server 162, or registration may be performed via a third-party. For example, a user may designate as part of a social network or other online profile that they are available for deliveries. By way of another example, a government licensing body may maintain a list of licensed delivery nodes that may be access by the delivery node coordination service provider. Registration as a delivery node may require one or more of the following pieces of information: license or certification number, credit card or other payment information, social media or other online account linking or identification information, email address, and personally identifiable information such as social security number, name, address, or the like.

Credit card or other payment information may be requested for a variety of reasons. The user node registering with the delivery coordination service provider may be required to provide a credit card to provide disincentive against non-delivery or late delivery. On acceptance of the delivery opportunity, or at the time of delivery pickup, the credit card may have a hold charge placed against it for the funds to cover, for example, the cost of the items to be delivered and an additional cost associated with a rushed second delivery and customer reimbursement if their delivery is not made or is not made on time. This hold associated with a delivery may be referred to as a delivery security retainer. When the delivery is successfully made on time, the hold is removed. Or if the delivery is made, but late, some portion of the hold may be maintained. Alternatively, late delivery may result in non-payment or reduction of the fee to be paid to the delivery node associated with that delivery opportunity.

Delivery source nodes, such as warehouses, restaurants, and grocery or retail stores may publish delivery opportunities. In one embodiment, they may publish it to a list of opportunities at a network location they own and manage. Alternatively, they may publish the delivery opportunities to a delivery opportunities clearinghouse or directly to the delivery coordination service provider server. In one embodiment, delivery opportunities may be published by delivery recipients. A delivery opportunity may include any of the following information associated with the delivery: weight, size, pickup location, drop-off location, delivery fee, delivery timeframe, delivery timeframe incentives, and the like. In one embodiment, the delivery opportunity may include one or more delivery authorization factors. A delivery authorization factor is a criterion that must be met for a delivery node to be acceptable for a particular delivery opportunity. One example of a delivery authorization factor is certification or licensure—certain delivery types may require certification or licensure such as a chauffeur's license for delivering a person. Certain hazardous materials may also require a particular license or certification. Food deliveries may require that the delivery node by certified in food handling safety. Deliveries of certain products such as alcohol and cigarettes may have the delivering individual's age as a delivery authorization factor. Another example of a delivery authorization factor is the available delivery security retainer. If a delivery node can only put up a $1000 delivery security retainer, they may not be able to deliver a $50,000 piece of art. In one embodiment, delivery insurance held by the delivery source node, delivery coordination service provider node, or delivery node may be used in place of or to supplement a delivery security retainer. A delivery authorization factor may also be a predetermined list of authorized delivery nodes for a particular delivery source. The predetermined list may be selected by the delivery source node, the delivery recipient node, or specified by the delivery coordination service provider. Another delivery authorization factor may be a delivery success or satisfaction rating. The delivery coordination service provider may maintain a record of the delivery success a particular delivery node has had. For example, were deliveries picked up and dropped off on time. Delivery source or delivery recipient satisfaction surveys or reports may also be taken into account. In one embodiment, multiple delivery success or satisfaction ratings may be maintained for a single delivery node for various delivery types. Another authorization factor may be related to social network relationships. For example, a delivery recipient may be comfortable having a friend in their social network deliver a product, whereas they would not be comfortable with a stranger. In one embodiment, certain delivery authorization factors may not all need to be met, but rather one of a set. Continuing with the previous example, the delivery recipient may not be comfortable with a stranger delivering the product unless that stranger holds a certain license or certification.

Each delivery may have a unique delivery identifier, or UID, associated with it. That UID may be associated with the physical delivery by attached RFID, or by a label, sticker, or some other packaging or wrapper with a QR code, bar code, or the like. On delivery pickup, the delivery node may, for example, scan the QR code associated with the delivery. Then, on drop-off, the delivery recipient may scan the QR code to confirm delivery receipt. Other methods of confirming delivery receipt may include the recipient providing the deliverer a confirmation code, the recipient providing a physical or electronic signature, the recipient providing some biometric confirmation, the recipient using an interface on their own device to confirm delivery, photographic or video confirmation, or the like.

Alternative to direct delivery to the recipient, the delivery may be made to a receptacle associated with the recipient. The receptacle could be a mailbox, a lockbox, an appliance such as a refrigerator, or the like. The receptacle may require a code for access that is provided to the deliverer. In one embodiment, other items may already be in the lockbox and the delivery security retainer required for delivery may include the value of those items. On deposit in the receptacle, the receptacle, or a device associated with the receptacle may scan the delivery, noting delivery receipt. The receptacle may also note if anything is removed. In fact, the removal may be intentional as the receptacle may also be the pickup point for a delivery. In one embodiment, instead of a receptacle the delivery recipient may specify a delivery proxy such as a doorman or a neighbor. A delivery recipient may also provide acceptable delivery timeframes.

In one embodiment, a delivery service node may also stock one or more products independent of a specific delivery request. For example, a food delivery truck may carry extra pizzas. By way of another example, another truck may carry certain staple goods such as tissue and toothpaste. The available product inventory already with each node may be stored electronically in association with that node. This may be referred to as mobile product inventory. In one embodiment, mobile product inventory may be stored in a vehicle that is not used for end delivery, but only for coordination with other delivery nodes. When a delivery opportunity is received, the delivery coordination service provider may also consider stock already with the delivery service node when determining what delivery node to select for a delivery or to which delivery nodes a delivery opportunity should be sent.

In certain locations, for example, rural locations, a supply van may be stocked with commonly used items determined by the purchase history of one or more clients. When a remote order is placed the delivery node may be determined based on present route and proximity to the supply van. Items may be provided to the determined delivery vehicle by the supply van. In some instances, the supply van may be designated as the delivery node and deliver items to the target client.

In one embodiment, a delivery may be dispatched based on a delivery request threshold greater than one. For example, an ice cream truck may have a standard or random route. However, a group of parents and kids at a playground off of that route may wish to have ice cream. More than one of the members of this group may request an ice cream delivery. When the multiple delivery requests associated with the park's location are received, the ice cream truck may adjust its route to go to that location. In one embodiment, the ice cream truck may send out a notification of a delivery point in proximity to the park. In one embodiment, the requests need not come from the same location, but only within a certain proximity.

In one embodiment, the delivery entity will be a drone that will supply items to designated coordinates. This may be particularly useful in supplying medical or emergency supplies to remove areas. Drones may also be used to drop items to delivery entities at designated coordinates. One example delivery scenario includes one or more hikers in a remote location, inaccessible by car, bicycle, or many other delivery vehicles. One of the hikers may be bitten by a snake and require antivenin. Using a mobile phone, one of the hikers may signal that they require a delivery of the antivenin. Based on the geographic location of the signal associated with their mobile phone, a location delivery is determined. The delivery opportunity is routed through the delivery coordination service provider and based on the location it is determined that an unmanned drone delivery method is preferable, for example because it is the only delivery service node type that can deliver within the required timeframe. The drone may already be in flight, stocked with the antivenin, or it may be loaded and take off at the time of the request. The drone then delivers the antivenin—either by landing or by dropping the product. One embodiment of the present invention includes a loyalty tracking system. A venue, for example a bar, restaurant, or retail shop, may utilize a third party loyalty program management service provider. The service provider may track patronage of customers, specific purchase histories of customers, and may also track potential customers. At the venue, the third party loyalty program management service provider may be integrated into a point of sale system, or separate hardware and/or software may manage the loyalty program. For example, the venue may employ mobile phones, magnetic card readers, wirelessly connected tablets or the like to provide integration with the loyalty program management service provider. Information about patronage or purchasing may be sent directly from the venue to the service provider. Alternatively, information about patronage or purchasing may be sent to the service provider by a payment service provider. For example, a payment service provider may be a credit card processor, an e-wallet service, PayPal, or the like. In one embodiment, the loyalty program management service may include or integrate with an electronic receipt system. In this manner, full purchase detail including specific items and prices may be available to the loyalty program management service provider. The loyalty program management service provider maintains user profiles of venue patrons. If information is sent directly from the venue, the information will identify the user profile that the patronage or specific purchase information is associated with. If information is sent from a payment service provider, the information will also include information associating the patronage or specific purchase information to a user. In order to associate a user with information received from a payment service provider, association must be maintained between the user's loyalty program account and their account with the payment service provider. In one embodiment, this association may be stored at the payment service provider. For example, when a loyalty program user registers a payment method with the loyalty program, the loyalty program sends a user identifier to the payment service provider that will be stored associated with their account. Subsequent transactions made by the user using that payment service provider will be communicated to the loyalty program management service provider including the user identifier. Alternatively, the association may be stored at the loyalty program management service provider. For example, when a loyalty program user registers a payment method with the loyalty program, a payment account identifier associated with the payment account may be stored at the loyalty program management service provider server. Subsequent transactions made by the user using that payment service provider will be communicated to the loyalty program management service provider including the payment account identifier.

A loyalty program management service may provide an interface for the venue to view loyalty program information. For example, the interface may include reports for frequency of patron visits, size of expenditures for patrons who visit on varying frequencies, total dollars earned by patrons who visit at various frequencies, and the like. In one embodiment, personally identifiable information associated with the patron may not be provided in the vendor loyalty interface. In one embodiment, only aggregate data comprising more than a minimum number of patrons will be displayed in the vendor loyalty interface. The vendor loyalty interface may also allow the venue to communicate with patrons. Communication with patrons may be done, for example, via email, text, notifications associated with a delivery service, a patron interface associated with the vendor loyalty program management service, or the like. Communication may be done on an individual basis or to a group of patrons based on selected profile characteristics.

In one embodiment, the loyalty program management service incorporates a loyalty rules engine that automatically manages at least certain aspects of communication with the patrons. For example, a thank you communication may be sent after a first visit to a venue. Another communication, for example a coupon for $10 off for example, may be sent after the patron has spent a total of $100 over all of their visits. A communication may be sent if the patron has not visited the venue in a certain period of time. The rule set within the rules engine may be designated by the loyalty program management service. Alternatively, the venue may specify the rule sets governing their automated communication. Future patron use of coupons or redemption of other offers may also be incorporated into the patron's profile.

For example, a user may register with a loyalty program service provider. In order to do this, the user may download a mobile application and register with an account. When the user then attends a participating venue, in order to demonstrate that they have patronized that venue, the user may use a GPS-based location check-in, as done with Foursquare® or Facebook® Places. Alternatively, the user may snap a picture of a QR code, a bar code, or some other venue specific identifier. In one embodiment, to demonstrate their specific patronage they may photograph their receipt from the venue. Alternatively, the mobile app may include an identifier such as a bar code, QR code, or a patron number that the venue must scan or enter into their interface for the loyalty program. When the venue is able to associate the patron with their loyalty program account it enables the venue to provide purchase information to the loyalty program management service directly. When the user information including, for example, their purchase information, is received at the loyalty program management service, the following steps may occur. The date and time of patronage at that venue is stored associated with the patron account. The amount of the purchase is associated with the patron account and the venue. The loyalty rules engine compares the details of the individual visit to the established loyalty communication rules. The loyalty rules engine may compare the patron profile after the individual visit to the established loyalty communication rules. If one or more rules are triggered, a communication is automatically sent to the patron. Alternatively, a patron's visit may trigger the loyalty rules engine to offer that patron a certain discount for that visit. In one embodiment, an interface available to the venue may indicate to the server or host that the patron is a member of the loyalty program and may list the loyalty benefits available to that patron during the visit. For example, the patron may have received an email indicating that they are eligible for a free appetizer from the venue. When the patron visits that venue, the server could ask the patron whether they would like to have their free appetizer without the patron having to indicate that they were hoping to do so.

In one embodiment, the loyalty program management service may track a user's total patronage across all participating venues. This aggregate information may be communicated to the venues or may be kept only by the loyalty program management service. Such aggregate information may be used to provide communications and benefits to the user for participating in the loyalty program, irrespective of the venues they have patronized. For example, when a user has reached a total expenditure level of $1000 across all participating venues, the loyalty program management service may communicate a $25 off coupon valid at any of the participating venues. The consumer decisions regarding what venue to use for a coupon that doesn't detail a specific venue may be collected and distributed to participating venues or utilized by the loyalty program management service. The decision of where to use the coupon may also be included in the user profile. Further, aggregate information associated with either an individual user of the loyalty program or aggregate information across multiple users of the loyalty program could be used to identify user patterns. For example, multiple users may stop patronizing a restaurant at a certain point in its loyalty program cycle. This could prompt the restaurant to review this point in the cycle and adjust the loyalty rules engine with the intent to avoid similar future drop-offs in patronage. By way of another example, an individual user may stop patronizing venues at certain points in their loyalty programs. This information could be used to develop one or more custom loyalty program offers for that user.

One embodiment of the present invention includes a specials clearinghouse service. A specials clearinghouse service collects deal, offer, coupon and other specials information associated with venues or other retail locations. Examples herein will focus on restaurants, but it should be understood that such a system may be employed for bars, clubs, retail sales locations, entertainment venues, services providers, and the like. Specials information held by the specials clearinghouse may be distributed directly to consumers by the specials clearinghouse or it may be syndicated out to various content providers for publication within any number of sites, mobile apps, physical mailers, and the like.

Collection of specials information may be accomplished using any of a variety of methods. For example, a call center may contact venues to inquire as their current and upcoming specials. An optical character recognition scanning or transcription service may collect specials from print advertisements. An internet scraping engine may parse web pages associated with venues to identify specials information. One internet location that may be scraped is Twitter®. The specials clearinghouse service may maintain a database associating venues to their Twitter feeds. Similarly, the specials clearinghouse service may maintain a database associating venues to their Facebook pages. A service scraping information from or utilizing the APIs of Twitter or Facebook may search for content that includes specials identification triggers. A specials identification trigger is one or more characters or phrases that are often associated with a special. For example, the dollar sign character, ($) the percent character (%), or the phrase "half off" all may be specials identification triggers. When content on a webpage associated with the venue, for example on Facebook or Twitter, includes one or more specials identification triggers, the content may be incorporated into the specials clearinghouse. In one embodiment, the specials clearinghouse may publicly advertise a specials identification trigger that venues may incorporate into content to be certain the content will be identified by the specials clearinghouse. For example, the specials clearinghouse may specify that the hash tag "#special" indicates that the content is a special.

A machine learning system may be used in conjunction with or independent of the defined specials identification triggers. For example, a Bayesian algorithm may be applied against social media posts, including the source social media service, author, and content of the post. A curator may teach the system which posts are offers and which are not. Such a system may be used to automatically filter social media posts to identify offers. In one embodiment, the machine learning may also identify what type of offer is being described, be it a new product announcement, discount, event, coupon, pre-purchased deal, or the like.

In one embodiment, information collected by the specials clearinghouse may be audited, verified, de-duplicated and generally cleansed by automated or manual processes. For example, a duplicate special identification algorithm may compare the content of all the specials associated with a venue. The algorithm makes a determination of the likelihood that two or more specials represent the same special. The determination may be binary, meaning simply specifying yes the special is a duplicate or no it is unique. Alternatively, a duplicate likelihood rating may be determined. In one embodiment, if the duplicate likelihood rating is above a certain level, the special is automatically marked as a duplicate or deleted from the system. A lower duplicate likelihood rating may flag for review the specials that are suspected of representing duplicate information. Specials clearinghouse personnel may then make the determination of whether the specials are unique or not. In one embodiment, the specials collected by the specials clearinghouse may be incorporated into one or more consumer interfaces. Consumers may be provided with a method of indicating if one or more specials appear to be duplicates. Consumer input may be incorporated into the automated duplicate likelihood rating.

The specials clearinghouse may maintain a specials management interface. For example, the specials clearinghouse may maintain a database of venues, and users registering with the specials management interface may claim venues from that database. Alternatively, a point of sale system may provide a specials management interface that integrates with the specials clearinghouse. The point of sale system may allow a venue user to register the point of sale system with the specials clearinghouse and associate the point of sale system to their particular venue. Once registered, a venue user may enter and manage their specials from the specials management interface. In one embodiment, the specials clearinghouse may allow the venue user to publish the specials information to one or more other websites. For example, the venue user may provide Facebook or Twitter account information and specify that they wish to have specials automatically posted to those accounts. In one embodiment the venue user may select certain specials for publication and may specify schedules for publication.

Venue users of the specials management interface may have the opportunity to pay for prioritized placement or display of their specials. For example, a venue may pay for each time their special is displayed higher on a page, or the venue may pay a fixed monthly fee for the same. As noted, payment may be for a prioritized display as opposed to placement which could include a different display format or colors or entirely separate placements only available for paid placements.

In one embodiment, venue users may specify automatic specials publication rules. An automatic specials publication rule may publish a new special or modify an existing special. An automatic specials publication rule may also specify that the special should be published with paid placement. For example, John's Dogs, a restaurant specializing in hot dogs, may wish to always have the best local hot dog deal on Wednesday nights. The venue user for John's Dogs may specify an area they consider to be their competition area. The competition area may be one or more zip codes or cities, or it may be a specific distance from the venue location. The venue user for John's Dogs may specify an automatic specials publication rule designating that if a hot dog special is collected by the specials clearinghouse where the offering venue is within 5 miles of John's Dogs, the Wednesday special for John's Dogs will automatically have the hot dog price adjusted to be 20% cheaper than that advertised in the competitors special. In one embodiment, a published automatic special alert is sent to the venue user. The published automatic special alert may be sent as an email, a text message, through the point of sale system, or by any method of as would occur to one skilled in the art.

Venue users may also be sent periodic reports or provided access to a reporting interface. Such reporting may provide summary information regarding the specials offered by other venues within a certain proximity. This report may be for all venues in the specified proximity or it may only include venues of the same genre or type as the venue user receiving the report. Alternatively it may only include venues with specials on similar items. Reporting may be provided on what items are most typically on special on what days. Using this reporting system the venue user may determine a specials strategy for their venue.

One embodiment of the present invention incorporates functions of a social networking service and a loyalty program management service. Data associated with users of a social networking service may be analyzed to apply certain characteristic profiles to the users of that network. Social graph data from the social networking service may be applied against patron loyalty profiles to identify patterns of patronage between connected individuals. Collectively the combined data between a social network service and a loyalty program management service may be called a loyalty web. Consider, for example, the data patterns of a user that might be considered a trend setter in a particular area. A trend setter in the area of dining may be found to check in to a restaurant on a date prior to a number of their friends within the social network doing the same for the first time. Data patterns for a social outing organizer may be that the user creates events in the social network that receive affirmative RSVPs. By associating a social network user profile to a loyalty program patron profile, the loyalty program management service may provide additional value to their venue customers. For example, the loyalty program service provider may allow venues to target notifications to user profiles that match one or more of these characteristic profiles. It may be beneficial to send a social outing organizer an offer such as "buy 2 entrees, get 2 entrees free," which will encourage them to make use of their ability to gather a group of four or more people for an outing. Similarly, a venue may wish to make significant discount offers to trend setters in the hopes that the friends of the trend setter will later become patrons. In one embodiment, the venue may be able to target offers only to trend setters whose friends have not already frequented the venue. Another very useful example of combining of tracking behavioral patterns in a social network to establish a characteristic profile would be to track how frequently a social network user checks in to establishments. On many social networks a check in is displayed to the friends of a user and can be considered an excellent advertisement. Allowing venue users of a loyalty program management service to target notification offers to users who consistently check in may be of significant benefit.

When specials information is collected from a third party site, interaction data with the specific special may be recorded and used in specials clearinghouse algorithms. For example, retweets on Twitter may be recorded, or likes or repostings on Facebook. These metrics may indicate that a post is a special. The metrics may also indicate that users are interested in that special and may affect the prioritization of that special's display.

As previously noted, a hash tag or other such text may be included in a post as a direct specials indicator. If this is, for example, a "#specials" hash tag, the specials clearinghouse may strip the hash tag from the post before displaying. Other indicators may be included in a post to communicate other information to the specials clearinghouse. For example, hash tags may indicate that a special occurs on certain days of the week, such as "#WednesdaySpecials" or simply "#W". Other instructions may be included to stop displaying specials or to only start displaying them on a certain day.

One embodiment of the present invention includes interfaces for interacting with venues or venue offerings with a focus on photographic images. For example, a browsable list of specials may include photos of the food items in the special. These photos may be more broadly of menu items as opposed to just specials. An interface may be provided to build a meal based on dragging and dropping images of the food. Users may be provided opportunity for other types of interaction with the photographs such as providing guesses as to the cost of the items in the photos. This may entice a user to go and purchase a product if they guess that it's more expensive and the price is lower, for example lower because it is on special. The price estimates received from users may also be communicated to the venue for use in future pricing decisions.

Combinations of the aforementioned services may provide additional value. For example, the concierge service may utilize the specials clearinghouse service to collect recommendations for certain concierge requests. For example, a user of Siri may ask, "where is a good place to get chicken wings?" A concierge service running behind the Siri application may relay parameters including "chicken wings" and the users location to the specials clearinghouse. The specials clearinghouse then returns to the concierge service one or more specials at locations proximate to the user. This information is relayed back to the user's device and Siri suggests the location, noting that there is a special there on chicken wings.

By way of another example, the loyalty program management service may be integrated with a specials clearinghouse service. In one embodiment, the specials clearinghouse may display certain specials only to users accessing the system who have certain loyalty status. The specials clearinghouse or loyalty program management service may also publicly display to all users, including those without loyalty status, those specials that are only available based on certain loyalty status. This may incent users to build loyalty with those venues to make those specials available to them. The loyalty status of a user associated with a venue may be displayed to the user in a numeric or graphical format, for example a bar chart, check boxes next to certain goals, or the like.

The present invention may be embodied in other specific forms without departing from its spirit or essential characteristics. The described embodiments are to be considered in all respects only as illustrative and not restrictive.

We claim:

1. A method of managing deliveries of products to customers, the method comprising:
    receiving, at one or more computing devices, a purchase request from a customer, wherein the purchase request identifies a first product of a first business;
    sending, by the one or more computing devices, a delivery opportunity to one or more delivery entities or drivers in response to the received purchase request;
    receiving, at the one or more computing devices, a response from the one or more delivery entities or drivers, wherein the response indicates an acceptance or availability of the one or more delivery entities or drivers for the delivery opportunity;
    selecting, by the one or more computing devices, a first delivery entity or driver from the one or more delivery entities or drivers for delivering the first product to the customer;
    receiving GPS location information associated with the first delivery entity or driver;
    determining a geographical location of the first delivery entity or driver based on the received GPS location information;
    determining a time or route for delivering the first product to the customer based on the GPS location information;
    determining, by the one or more computing devices, at least one promotional or additional product of the first business or of a second business;
    determining, by the one or more computing devices, a target area based on a location of the customer;
    sending, by the one or more computing devices, a notification of the at least one promotional or additional product to the customer and/or potential customers within the determined target area;
    receiving, by the one or more computing devices, at least one request for a purchase of the at least one promotional or additional product from the customer and/or at least one customer of the potential customers within the determined target area;

sending, by the one or more computing devices, a purchase confirmation to the customer and/or the at least one customer within the determined target area; and sending, by the one or more computing devices, a notification to the first delivery entity or driver to pick-up at least the first product.

2. The method of claim 1, further comprising adjusting a delivery schedule or route based on the at least one purchase request for the at least one promotional or additional product.

3. The method of claim 2, further comprising determining an adjusted target area based on the adjusted delivery schedule or route and sending at least one notification of the at least one promotional or additional product to potential customers within the determined adjusted target area.

4. The method of claim 1, wherein the at least one promotional or additional product is located at the second business or is transported by the first delivery entity or driver prior to receiving the at least one purchase request for the at least one promotional or additional product.

5. The method of claim 1, wherein the at least one notification of the at least one promotional or additional product is sent to the potential customers in the target area during a delivery to the location of the customer.

6. The method of claim 1, wherein the target area is further determined based on a delivery route.

7. The method of claim 1, wherein the at least one promotional or additional product is determined based on at least one product profile associated with the target area or a purchase history of the customer and/or the potential customers within the determined target area.

8. The method of claim 1, wherein the at least one promotional or additional product comprises a service.

9. The method of claim 1, wherein the first delivery entity or driver is further selected based on at least one delivery service capability or a distance between the geographical location of the first delivery entity or driver to a pick-up location.

10. The method of claim 1, wherein the at least one promotional or additional product is delivered to the customer and/or the at least one customer of the potential customers within the determined target area.

11. The method of claim 1, further comprising providing a notification to the customer and/or the at least one customer indicating a drop off time of the first product and/or the at least one promotional or additional product.

12. The method of claim 11, wherein the drop off time is padded to allow for promotional product sales and delivery.

13. The method of claim 1, wherein the first delivery entity or driver is further selected based on certification, licensure, security retainer, delivery insurance, authorized delivery nodes, success rating, satisfaction rating, social network relationships, a distance to a pick-up location, a distance to the customer, a distance to the first or second business, or a combination thereof.

14. The method of claim 1, further comprising:
receiving an acceptance, at the one or more computing devices, from the first delivery entity or driver for a delivery of the first product to the customer;
receiving an acceptance, at the one or more computing devices, from a second delivery entity or driver for a delivery of the at least one promotional or additional product to the customer or the at least one customer of the potential customers; and
sending a notification to the second delivery entity or driver to inform the second delivery entity or driver to provide the at least one promotional or additional product to the first delivery entity or driver at a particular location.

15. The method of claim 14, further comprising receiving confirmation of a delivery of the first product.

16. The method of claim 1, further comprising:
receiving an acceptance, at the one or more computing devices, from the first delivery entity or driver for a delivery of the first product to the customer;
receiving an acceptance, at the one or more computing devices, from a second delivery entity or driver for a delivery of the at least one promotional or additional product to a receptacle; and
sending a notification to the first delivery entity or driver to pick-up the at least one promotional or additional product from the receptacle.

17. The method of claim 16, further comprising receiving a notification from the second delivery entity or driver confirming delivery of the first product to the receptacle.

18. The method of claim 1, wherein the first delivery entity or driver is selected based on a certification and/or licensure to deliver the first product.

19. The method of claim 1, wherein the first delivery entity or driver is selected based on a delivery security retainer, delivery insurance, a distance to a pick-up location, a distance to the customer, a distance to the first or second business, or a combination thereof.

20. The method of claim 1, wherein the first delivery entity or driver is included on a predetermined list of authorized delivery drivers.

21. The method of claim 1, wherein the first delivery entity or driver is selected based on a delivery success rating or a delivery satisfaction rating.

22. The method of claim 1, wherein the potential customers are selected based on a social network relationship.

23. The method of claim 1, further comprising sending the purchase request to be displayed on a graphical user interface.

24. The method of claim 1, wherein the first delivery entity or driver comprises a manned vehicle, an unmanned vehicle, or a drone.

25. The method of claim 1, further comprising identifying the one or more delivery entities or drivers based on the GPS location information.

26. The method of claim 1, wherein the first delivery entity or driver is selected based on the geographical location of the first delivery entity or driver relative to the first business.

27. The method of claim 1, further comprising determining a time or route for delivering the least one promotional or additional product to the user or customer and/or the at least one customer based on the GPS location information.

28. A system for managing deliveries of products to customers, the system comprising:
a memory device;
at least one computing device configured to:
receive a purchase request from a customer, wherein the purchase request identifies a first product of a first business;
send a delivery opportunity to one or more delivery drivers in response to the received purchase request;
receive a response from the one or more delivery drivers, wherein the response indicates an availability of the one or more delivery drivers for the delivery opportunity;
select a first delivery entity or driver from the delivery drivers for delivering the first product;

receive GPS location information associated with the first delivery entity or driver;
determine a geographical location of the first delivery entity or driver based on the received GPS location information;
determine a time or route for delivering the first product to the customer based on the GPS location information;
determine at least one promotional or additional product of the first business or of a second business;
determine a target area based on a location of the customer;
send a notification of the at least one promotional or additional product to the customer and/or potential customers within the determined target area;
receive at least one request for the at least one promotional or additional product from the customer and/or at least one customer of the potential customers within the determined target area;
send a purchase notification to the customer and/or the at least one customer within the determined target area; and
send a notification to the first delivery entity or driver to pick-up the first product.

29. The system of claim 28, wherein the at least one computing device is further configured to adjust a delivery route based on the received request for the at least one promotional or additional product.

30. The system of claim 29, wherein the at least one computing device is further configured to:
determine an adjusted target area based on the adjusted delivery route; and
send at least one notification of the at least one promotional or additional product to the customer and/or potential customers within the determined adjusted target area.

31. A non-transitory computer readable storage medium comprising instructions that when executed perform a method comprising:
receiving a purchase delivery request for a first product, wherein the purchase delivery request identifies a first product of a first business;
sending a delivery opportunity to one or more delivery entities or drivers in response to the received purchase delivery request;
receiving a response from the one or more delivery entities or drivers, wherein the response indicates an availability of a delivery entity or driver for the delivery opportunity;
selecting a first delivery entity or driver from the one or more delivery entities or drivers for delivering the first product;
receiving GPS location information associated with the delivery entity or driver;
determining a geographical location of the first delivery entity or driver based on the received GPS location information;
determining a time or route for the delivery of the first product to a user or customer based on the GPS location information;
determining at least one promotional or additional product of the first business or of a second business;
determine a target area based on a location of the user or customer;
sending a notification of the at least one promotional or additional product to the user or customer and/or potential customers within the determined target area;
receiving at least one request for the at least one promotional or additional product from the user or customer and/or at least one customer of the potential customers within the determined target area;
sending a purchase notification of the promotional product to the user or customer and/or the at least one customer within the determined target area; and
sending a notification to the first delivery entity or driver to pick-up at least the first product.

32. A method comprising:
receiving, by one or more computing devices, a pick-up request, wherein the pick-up request indicates a pick-up location and a destination;
receiving, by the one or more computing devices, GPS location information for one or more driving entities or drivers;
selecting, by the one or more computing devices, a first driving entity or driver of the one or more driving entities or drivers based on a location of the first driving entity or driver relative to the pick-up location;
determining, by the one or more computing devices, a time or route for the first driving entity or driver to travel to the destination based at least on the GPS location information;
receiving, by the one or more computing devices, at least one request from a customer and/or at least one potential customer for a product or service; and
sending, by the one or more computing devices, a notification to the first delivery entity or driver about a location of the product or service.

33. The method of claim 32, further comprising modifying the time or route of the first driving entity or driver to travel to the destination.

34. The method of claim 32, wherein the pick-up request identifies at least one product for delivery to a customer and a location of the at least one product.

35. The method of claim 32, wherein the at least one request identifies the product or service.

36. The method of claim 32, further comprising determining a target area based the destination or a delivery route and sending at least one notification to the customer and/or potential customers within the determined target area about the product or service.

37. The method of claim 32, further comprising determining a target area based on the destination or a delivery route, wherein the customer and/or the at least one potential customer are determined based on the target area.

38. The method of claim 32, wherein the product is located at a business or is transported by the first driving entity or driver prior to receiving the at least one request for the product or service.

39. The method of claim 32, wherein the pick-up request is received from a first business and the at least one request is received from a second business.

40. The method of claim 32, wherein the first driving entity or driver comprises a manned vehicle, an unmanned vehicle, or a drone.

41. A method comprising:
receiving, by one or more computing devices, GPS location information associated with a first delivery entity or driver;
determining, by the one or more computing devices, a geographical location of the first delivery entity or driver based on the received GPS location information;
determining, by the one or more computing devices, a time or route for the first driving entity or driver to travel to a destination based at least on GPS location information, wherein the first driving entity or driver is transporting a first product to a first customer located at the destination;

receiving, by the one or more computing devices, at least one request from the first customer and/or a second customer for delivery of a second product; and sending, by the one or more computing devices, a notification to the first delivery entity or driver to deliver the second product to the first or second customer.

* * * * *